(12) United States Patent
Nibe

(10) Patent No.: US 7,830,818 B2
(45) Date of Patent: Nov. 9, 2010

(54) RECEPTION QUALITY MEASUREMENT METHOD, TRANSMISSION POWER CONTROL METHOD AND DEVICES THEREOF

(75) Inventor: Keiji Nibe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 233 days.

(21) Appl. No.: 12/128,380

(22) Filed: May 28, 2008

(65) Prior Publication Data

US 2008/0316934 A1 Dec. 25, 2008

(30) Foreign Application Priority Data

Jun. 25, 2007 (JP) ............................. 2007-165937

(51) Int. Cl.
*H04J 1/16* (2006.01)

(52) U.S. Cl. ...................... 370/252; 370/241; 455/522

(58) Field of Classification Search ................. 370/241, 370/252, 332; 455/522
See application file for complete search history.

(56) References Cited

U.S. PATENT DOCUMENTS

2004/0259584 A1* 12/2004 Murata et al. ............... 455/522

FOREIGN PATENT DOCUMENTS

EP 1901440 A1 * 3/2008

| JP | 11308655 | 11/1999 |
|---|---|---|
| JP | 2005-012512 | 1/2005 |
| WO | 2007004292 A1 | 1/2007 |
| WO | WO 2007/004292 | 1/2007 |

OTHER PUBLICATIONS

Partial European Search Report dated Feb. 18, 2010 received in corresponding EP Patent Application No. 08157991.4-2411/2009818.
Partial European Search Report dated May 7, 2010 received in corresponding EP Patent Application No. 08157991.4-2411/2009818.

* cited by examiner

*Primary Examiner*—William Trost, IV
*Assistant Examiner*—Siming Liu
(74) *Attorney, Agent, or Firm*—Hanify & King, P.C.

(57) ABSTRACT

A mobile station that receives F-DCPH symbols and CPICH symbols from a base station: (1) averages a plurality of CPICH symbols in a time sequence before a certain time of interest and estimates a channel, then uses the obtained channel estimation value and the CPICH symbol at the time of interest to calculate an interference power ISCP; (2) averages a plurality of CPICH symbols in a time sequence that include the CPICH symbol at the time of interest and estimates a channel, then uses the obtained channel estimation value and the CPICH symbol at that time of interest to calculate a reference ISCP; (3) corrects an interference power ISCP at the next time of interest using the difference between the ISCP and the reference ISCP; and (4) uses the ISCP that is obtained by the correction and a reception power RSCP of the F-DCPH symbol to calculate a signal to interference power ratio SIR of the mobile station.

22 Claims, 20 Drawing Sheets

FIG. 6

EXAMPLE OF A TABLE CORRESPONDING
TO THE AMOUNT OF ISCP CORRECTION

| Target TPC Command Error Rate | ISCP ERROR = -0.1 Target SIR | ISCP ERROR = 0 Target SIR | ISCP ERROR = +0.1 Target SIR |
|---|---|---|---|
| 0.1 | -3.4 | -3.3 | -3.2 |
| 0.09 | -3.1 | -3.0 | -2.9 |
| 0.08 | -2.9 | -2.8 | -2.7 |
| 0.07 | -2.6 | -2.5 | -2.4 |
| 0.06 | -2.4 | -2.3 | -2.2 |
| 0.05 | -2.1 | -2.0 | -1.9 |
| 0.04 | -1.6 | -1.5 | -1.4 |
| 0.03 | -1.1 | -1.0 | -0.9 |
| 0.02 | -0.5 | -0.4 | -0.3 |
| 0.01 | 0.6 | 0.7 | 0.8 |
| | 73a | 73b | 73c |

FIG. 8

EXAMPLE OF A TABLE CORRESPONDING
TO THE AMOUNT OF RSCP CORRECTION

| Target TPC Command Error Rate | RSCP ERROR = −0.1 Target SIR | RSCP ERROR = 0 Target SIR | RSCP ERROR = +0.1 Target SIR |
|---|---|---|---|
| 0.1 | −3.2 | −3.3 | −3.4 |
| 0.09 | −2.9 | −3.0 | −3.1 |
| 0.08 | −2.7 | −2.8 | −2.9 |
| 0.07 | −2.4 | −2.5 | −2.6 |
| 0.06 | −2.2 | −2.3 | −2.4 |
| 0.05 | −1.9 | −2.0 | −2.1 |
| 0.04 | −1.4 | −1.5 | −1.6 |
| 0.03 | −0.9 | −1.0 | −1.1 |
| 0.02 | −0.3 | −0.4 | −0.5 |
| 0.01 | 0.8 | 0.7 | 0.6 |
| | 73a′ | 73b′ | 73c′ |

FIG. 10

TABLE CORRESPONDING TO TPC BIT DIFFERENCES

| Target TPC Command Error Rate | TPC SYMBOL DECODING ERROR = 0 Target SIR | TPC SYMBOL DECODING ERROR = 0.01 Target SIR | TPC SYMBOL DECODING ERROR = 0.02 Target SIR |
|---|---|---|---|
| 0.1 | −3.3 | −3.0 | −2.8 |
| 0.09 | −3.0 | −2.8 | −2.5 |
| 0.08 | −2.8 | −2.5 | −2.3 |
| 0.07 | −2.5 | −2.3 | −2.0 |
| 0.06 | −2.3 | −2.0 | −1.5 |
| 0.05 | −2.0 | −1.5 | −1.0 |
| 0.04 | −1.5 | −1.0 | −0.4 |
| 0.03 | −1.0 | −0.4 | 0.7 |
| 0.02 | −0.4 | 0.7 | 0.9 |
| 0.01 | 0.7 | 0.9 | 1.0 |
|  | 73a″ | 73b″ | 73c″ |

DPCH FRAME CONFIGURATION

F-DPCH FRAME CONFIGURATION

FIG. 20 PRIOR ART

| Target TPC Command Error Rate | Target SIR |
|---|---|
| 0.1 | −3.3 |
| 0.09 | −3.0 |
| 0.08 | −2.8 |
| 0.07 | −2.5 |
| 0.06 | −2.3 |
| 0.05 | −2.0 |
| 0.04 | −1.5 |
| 0.03 | −1.0 |
| 0.02 | −0.4 |
| 0.01 | 0.7 |

RECEPTION QUALITY MEASUREMENT METHOD, TRANSMISSION POWER CONTROL METHOD AND DEVICES THEREOF

BACKGROUND OF THE INVENTION

The present invention relates to a reception quality measurement method, transmission power control method and devices thereof, and more particularly, a reception quality measurement method, transmission power control method and devices thereof for a mobile station that receives F-DCPH symbols and CPICH symbols from a base station.

A W-CDMA (UMTS) mobile communication system is one kind of radio communication interface that is based upon IMT-2000 (International Mobile Telecommunications-2000), and by using a maximum transmission speed of 384 Kbps, makes access of multimedia such as sound, moving images, data and the like possible. As shown in FIG. 11, this W-CDMA mobile communication system comprises: a core network 1; radio base station control devices (RNC: Radio Network Controllers) 2, 3; multiplexing/separation devices 4, 5; radio base stations (Node B) $6_1$ to $6_5$; and a mobile station (UE: User Equipment) 7. The core network 1 is a network for performing routing in the mobile communication system; for example, the core network can be an ATM exchange network, packet exchange network, router network, etc. The core network 1 is also connected to other public networks (PSTN), making it possible for a mobile station 7 to perform communication between itself and a fixed telephone or the like.

The radio base station control devices (RNC) 2, 3 are located as host devices to the radio base stations $6_1$ to $6_5$, and comprise functions for controlling these radio base stations $6_1$ to $6_5$. The radio base station control devices 2, 3 also comprise a handover control function so that during handover, signals from one mobile station 7 are received by way of a plurality of subordinate radio base stations, and the data is selected from the signal having the best quality and transmitted to the core network 1.

The multiplexing/separation devices 4, 5 are located between the RNC and radio base stations, and they perform control for separating signals that are received from the RNC 2, 3 and destined for each of the radio base stations, and together with outputting those signals to the radio base stations, multiplex signals from the radio base stations and transfer them to each RNC.

The radio base stations $6_1$ to $6_5$ perform radio communication with the mobile station 7, and are such that RNC 2 manages the radio resources of the base stations $6_1$ to $6_3$, and RNC 3 manages the radio resources of the base stations $6_4$, $6_5$. The mobile station 7 establishes a radio communication between itself and a radio base station 6i when it is within the radio communication area of the radio base station 6i, and performs communication between itself and another communication terminal by way of the core network 1.

HSDPA

A typical W-CDMA mobile communication system has been explained above, however, the HSDPA (High Speed Downlink Packet Access) method is further employed as a technique for making high-speed transmission in the down link direction possible. HSDPA uses an adaptive encoding modulation method (AMC: Adaptive Modulation and Coding); for example, this method is characterized by adaptively switching between a QPSK modulation method (QPSK modulation scheme) and a 16-value QAM method (16 QAM scheme) according to the state of radio communication between the radio base station and mobile station. The HSDPA method also uses a H-ARQ (Hybrid Automatic Repeat request) method. In the H-ARQ method, when the mobile station detects an error in data received from the radio base station, the mobile stations sends a request (sends a NACK signal) to the radio base station to resend the data. The radio base station that receives this resend request resends the data, so the mobile station that has already received the data uses both this data and the resent data that it receives to perform error correction decoding.

As shown in FIG. 12, the main radio channels that are used in HSDPA are as follows:

(1) HS-SCCH (High Speed-Shared Control Channel, (2) HS-PDSCH (High Speed-Physical Downlink Shared Channel), (3) HS-DPCCH (High Speed-Dedicated Physical Control Channel), HS-SCCH and HS-PDSCH are both shared channels in the downlink direction (downlink in the direction from the radio base stations to the mobile station), where HS-SCCH is a control channel for sending to the mobile stations various kinds of parameters related to the data that is sent by HS-PDSCH. The various kinds of parameters could be destination information that indicates which mobile station data is to be sent to, transmission bit rate information, modulation method information that indicates which modulation method is used in sending data by HS-PDSCH, allotment number (code number) for spreading codes, a pattern for rate matching that is performed for the transmission data, etc.

On the other hand, HS-DPCCH is an individual control channel (dedicated control channel) for the uplink direction (uplink in the direction from the mobile station to the radio base station), and is used when the mobile station sends reception results (ACK signal, NACK signal) depending on whether or not there was error in the data received via the HS-PDSCH. That is, it is a channel that is used for sending reception results for data that is received via the HS-PDSCH. When a mobile station fails to receive data (there is a CRC error or the like in the reception data), the mobile station sends a NACK signal, so the radio base station executes resend control.

Transmission Power Control

In W-CDMA mobile communication, by identifying each of channels according to the spreading code that is allotted to each channel, a plurality of channels perform communication by sharing one frequency bandwidth. However, in an actual mobile communication environment, the reception signal receives interference from its own channel and other channels due do the delay wave in multipath fading or a radio signal from another cell, and that interference has an adverse effect on channel separation. Moreover, the amount of interference that the reception signal receives changes over time due to instantaneous fluctuation in the reception power caused by the multipath fading, or change in the number of users communicating at the same time. In a communication environment in which the interference that changes over time generates in this way, it is difficult to stabilize and maintain the quality of the reception signal at the mobile station connected to the base station at a desired level of quality. In order to cope with this kind of change in the number of interfering users or the instantaneous fluctuation in values due to the multipath fading, the receiving side (mobile station) measures the signal to interference power ratio (SIR), and by comparing the measured SIR with a target SIR, transmission power control is performed to bring the SIR of the mobile station close to the target SIR.

FIG. 13 is drawing explaining transmission power control of a mobile station, and shows only one channel. The spreading modulation unit 6a of the base station 6 uses a spreading code that corresponds to a specified channel to spread and modulate transmission data, a power amplifier 6b amplifies the signal obtained by processing such as quadrature modulation and frequency conversion after the spreading modulation, and the amplified signal is sent to the mobile station 7 from the antenna. The inverse spreading unit 7a of the reception unit of the mobile station 7 performs inverse spreading on the reception signal, and the demodulation unit 7b demodulates the reception data. The SIR measurement unit 7c measures the power ratio between the reception signal and interference signal. The comparison unit 7d compares the measured SIR with a target SIR, and when the measured SIR is greater than the target SIR, creates a command to lower the transmission power by the TPC (Transmission Power Control) bit, and when the measured SIR is less than the target SIR, creates a command to raise the transmission power by the TPC bit. The target SIR is the SIR value that is necessary for obtaining $10^{-3}$ (error occurrence rate of 1 time per 1000 times), and this value is input to the comparison unit 7d from the target SIR control unit 7e. The spreading modulation unit 7f spreads and modulates the transmission data and TPC bit. After spreading and modulation, the mobile station performs processing such as DA conversion, quadrature modulation, frequency conversion and power amplification, and sends the result to the base station 6 from the antenna. The inverse spreading unit 6c on the base station side performs inverse spreading on the signal received from the mobile station 7, the demodulation unit 6d demodulates the reception data and TPC bit, and controls the transmission power of the power amplifier 1 according to the command indicated by that TPC bit. The transmission power control described above is called inner-loop transmission power control.

FIG. 14 is a drawing showing the configuration of the individual physical channel DPCH (Dedicated Physical Channel) frame in the uplink that is normalized by the 3rd Generation Partnership Project (hereafter, referred to as 3GPP). The dedicated physical channel DPCH comprises a DPDCH channel (Dedicated Physical Data Channel) by which only transmission data is transmitted, and DPCCH channel (Dedicated Physical Control Channel) by which control data such as a pilot and the TPC bit information that was explained in FIG. 13 are multiplexed and transmitted. The data transmitted by the DPDCH channel and DPCCH channel are spread by respective orthogonal code, after which the data is mapped and multiplexed on the real number axis and imaginary number axis. One frame in the uplink is 10 msec, and is configured with 15 slots (slot #0 to slot #14). The DPDCH channel is mapped on the I channel, and the DPCCH channel is mapped on the orthogonal Q channel. Each slot of the DPDCH channel comprises n bits, where n changes according to the symbol speed. Each slot of the DPCCH channel that transmits control data comprises 10 bits, where the symbol speed is fixed at 15 ksps, and transmits a pilot Pilot, transmission power control data TPC, transport format combination indicator TFCI, and feedback information FBI.

Due to changes in the propagation environment due to movement or change in the speed of movement during communication, the SIR that is necessary in order to obtain the desired quality (block error rate: BLER) is not fixed. BLER is the ratio between the total number of transport blocks (TrBk) during a fixed period, and the number of TrBk for which a CRC error occurred. In order to deal with this change, transmission power control further observes the BLER, and when the observed value is worse than the set target BLER, increases the target SIR, and when the observed value is better than the set target BLER, decreases the target SIR. In other words, at the same time as inner-loop transmission power control, the mobile station performs outer-loop transmission power control to control the target SIR in order to obtain the desired quality (block error rate BLER).

In FIG. 13, after the required BLER is specified according to the type of service from the host application, the target SIR control unit 7e inputs a target SIR that corresponds to the required BLER to the comparison unit 7d. At the same time as the inner-loop transmission power control described above, the error-correction decoding unit 7g performs error detection/correction and decoding of the demodulated result from the demodulation unit 7b, and inputs the decoded result to the CRC detection unit 7h. The CRC detection unit 7h separates the decoded data into transport blocks TrBk, and then performs CRC error detection of each transport block TrBk and inputs the error detection results to the target SIR control unit 7e. The target SIR control unit 7e measures the actual BLER based on the error detection result, then compares the measured BLER with the required BLER, and when the reception state is poor and the measured BLER is greater than the required BLER, performs control to increase the target SIR, however when the reception state is good and the measured BLER is less than the required BLER, performs control to decrease the target SIR. By performing this outer-loop transmission power control, it is possible to control the transmission power so that the required BLER can be obtained.

F-DPCH

In a W-CDMA communication system that employs the HSDPA method, the user (mobile station) is able to receive data over a HS-PDSCH, which is a shared channel (see FIG. 12), and at the same time is able to receive data over an individual channel DPCH (Dedicated Physical Channel).

FIG. 15 shows an example of the format of the dedicated physical channel DPCH in the downlink from a base station to a mobile station. One frame comprises 15 slots, slot #0 to slot #14, and each slot is configured so that a first data section Data1, TPC information, TFCI information, second data section Data2 and Pilot information are transmitted by time division multiplexing. The downlink dedicated channel DPCH is comprised of a DPDCH (Dedicated Physical Data Channel) that transmits data, and a DPCCH (Dedicated Physical Control Channel) that transmits control data (TPC information, TFCI information, Pilot).

In a W-CDMA communication system that employs the HSDPA method, in most cases there is no data to be transmitted over the dedicated channel to a user (mobile station) that is receiving data at high speed over the shared channel such as HS-PDSCH. However, even though there is no data to be transmitted over the dedicated channel DPCH, it is necessary for the base station to transmit specified symbols (for example, a TPC symbol) over the dedicated channel DPCH in order to perform the transmission power control described above. That is, the base station must connect to the dedicated channel DPCH at the same time as the shared channel HS-PDSCH, so even though it may not be necessary to transmit data over the dedicated channel DPCH, one spreading code is occupied for sending the TPC symbol, and as a result, when there is a plurality of similar users, a problem will occur in that there will not be enough resources.

A F-DPCH (Factional Dedicated Physical Channel) is a channel that is normalized by 3GPP release 6 (3rd Generation Partnership Project Release 6) in order to solve this problem, wherein it has frame configuration as shown in FIG. 16, and an individual channel transmits only transmission power control information (TPC symbol). The base station assigns one spreading code to F-DPCH, and spreads that F-DPCH by that spreading code, and as showing in FIG. 17 by making the transmission timing (offset) different for each user, performs transmission so that TPC symbols do no overlap between different users. In other words, the base station uses a F-DPCH instead of the dedicated channel DPCH to transmit only a TPC symbol to a user for which there is no data to transmit over the dedicated channel DPCH, and in so doing solves the problem of insufficient resources.

In transmission power control by the dedicated channel DPCH, in order to perform high-precision TPC control, two kinds of control are performed, inner-loop transmission power control that measures SIR and performs control so that the measured SIR will become a target SIR, and outer-loop transmission power control that performs CRC computation and measures the BLER and corrects the target SIR so that the measured BLER becomes the required BLER. However, since data is not transmitted over a F-DPCH, a CRC signal is not added to the data format of the F-DPCH. Therefore, when transmission is performed using F-DPCH instead of DPCH, it is not possible to perform outer-loop transmission power control. In that case, the control method described below is adopted in transmission power control when performing transmission using F-DPCH. In other words, a method is employed in which a correspondence table that shows the correspondence between the target SIR of the TPC symbol received from the base station and the target error rate of the F-DPCH is used, and when the required F-DPCH target error rate is set, the target SIR is found from that table and control is performed so that the measured actual SIR of the TPC symbol coincides with that target SIR.

FIG. 18 is a drawing explaining the transmission timing of a downlink F-DPCH that is transmitted from the base station, and a DPCCH (see FIG. 14) that is transmitted from the mobile station and includes a TPC bit. The F-DPCH is transmitted being delayed a specified offset Toff for each user from a reference timing T0 at which the downlink CPICH (Common Pilot Channel) or P-CCPCH (Primary Common Control Physical Channel) is transmitted. The mobile station receives the TPC bit that is included in the F-DPCH and measures the SIR, then performs transmission power control based on that SIR. After a time of 1024 chips from the transmission timing of the F-DPCH, the mobile station transmits an uplink DPCCH that includes a TPC bit, which is the transmission power control data, to the base station. The timing that this uplink DPCCH is transmitted to the base station is a time that set according to the 3GPP and is a fixed time.

Conventional Mobile Station

FIG. 19 is a drawing showing the construction of a conventional mobile station, and shows the main construction of parts for receiving the TPC bit that is included in the F-DPCH, measuring the SIR, performing transmission power control based on that SIR, setting a TPC bit as transmission power control information, and sending an uplink DPCCH that includes that TPC bit to the base station.

The radio signal that is sent from the base station is received by the antenna and input to the receiver 11. After performing down conversion of the radio signal to a baseband signal, the receiver 11 performs processing such as quadrature modulation, AD conversion, inverse spreading and the like on the obtained baseband signal, and outputs a F-DPCH symbol signal, CPICH symbol signal and reception timing signal (frame synchronization signal, slot synchronization signal). A channel estimation filter 12 used for calculating the RSCP (Received Signal Code Power) calculates the average value of the previous n symbols to the current symbol, for example the average of 10 symbols, of the CPICH symbol signal, then computes the channel estimation value from that average value and outputs it at the symbol cycle. One slot of the CPICH comprises 10 symbols, so these 10 symbols are equivalent to the portion of one slot. An RSCP measurement processing unit 13 performs channel compensation on the F-DPCH symbol signal (TPC symbol) based on the channel estimation value input from channel estimation filter 12, then measures the reception power of that TPC symbol and inputs the result to a SIR measurement processing unit 14 as the RSCP.

A channel estimation filter 15 used for calculating the ISCP (Interference on Signal Code Power) calculates the average value of the symbols previous to the current symbol of the CPICH symbol signal, then computes the channel estimation value from that average value and outputs the result at the symbol cycle. An ISCP measurement processing unit 16 calculates the power of the interference signal using a CPICH symbol that was received at the same reception timing as the TPC symbol of the F-DPCH, a known CPICH symbol, and the channel estimation value input from the channel estimation filter 15, and inputs the result to the SIR measurement processing unit 14 as the ISCP. The SIR measurement processing unit 14 uses the input RSCP and ISCP to calculate and output the SIR according to the equation below.

$$SIR = RSCP/ISCP$$

After the target error rate is set by the UTRAN (UMTS Terrestrial Radio Access Network) 18, a target SIR control unit 17 make a reference to a target error rate/target SIR conversion table 19 to find a target SIR that corresponds to the target error rate, and inputs the result to a TPC command generation unit 20. FIG. 20 shows an example of a target TPC error rate/target SIR conversion table, and FIG. 21 is a graph showing the characteristics of the TPC error rate versus the target SIR, where A is the characteristics in a normal environment.

The TPC command generation unit 20 sets a TPC command (Up or Down) from the measured SIR result and the target SIR, and inputs that TPC command to a DPCCH processing unit (Pilot/TFCI/FBI/TPC scheduling unit) 21.

At the same time as the above processing, a downlink reception timing monitoring unit 22 monitors the downlink timing based on the reception timing signal (frame synchronization signal, slot synchronization signal), and an uplink transmission timing management unit 23 inputs a transmission timing signal to the DPCCH processing unit 21. The DPCCH processing unit 21 performs time division multiplexing of the uplink DPCCH Pilot, TFCI, FBI and TPC, and outputs a DPCCH symbol in synchronization with the transmission timing signal. A DPCCH encoding unit 24 encodes the input DPCCH symbol, a modulation unit 25 performs modulation of the DPCHH and other uplink channels, and a transmitter 26 converts the modulated signal to a radio signal and transmits it toward the base station.

FIG. 22 is a drawing showing a time chart image in symbol units of the calculation process of ISCP, RSCP and SIR in the F-DPCH. When performing demodulation of the F-DPCH by the mobile station, in order to demodulate the TPC symbol $S_{TPCn}$ of slot #n, the channel estimation filter 12 for calculating the RSCP performs the channel estimation filtering process using the reception wave of slot #n−1 of the CPICH (step 101). After performing channel compensation of the F-DPCH symbol signal (TPC symbol) based on the channel estimation value, the RSCP measurement processing unit 13 measures the reception power RSCP of that TPC symbol and inputs it to the SIR measurement processing unit 14 (step 102).

The channel estimation filter 15 for calculating the ISCP also performs the channel estimation filtering process using the reception wave of slot #n−1 of the CPICH (step 103). The ISCP measurement processing unit 16 calculates the reception power ISCP of the interference signal using a CPICH symbol that is received at the same reception timing as the TPC symbol of the F-DPCH, a known CPICH symbol and the channel estimation value that was obtained in step 103, and inputs it to the SIR measurement unit 14 (step 104). The SIR measurement processing unit 14 uses the input RSCP and ISCP to calculate and output the SIR (step 105).

By the process described above, the mobile station measures the SIR, then based on the size of the measured SIR and a target SIR, decides the TPC bit, and maps that TPC bit on the uplink DPCCH that is sent 1024 chips after receiving the F-DPCH, and transmits it to the base station. When doing this, the mobile station performs channel estimation using the reception wave of slot #n−1 of the CPICH, and measures the SIR of the TPC symbol of the F-DPCH of slot #n.

The channel estimation value that was measured using the reception wave of slot #n−1 of the CPICH indicates a value at the center time (past time) of that slot #n−1, and is not the channel estimation value at the reception time of the F-DPCH symbol of slot #n. Therefore, if the channel estimation result varies in a short period of time in a fading environment or multipath environment, there generates an environment where the past channel estimation value and current channel estimation value differ, and as a result a phenomenon occurs in which there is deterioration of the ISCP value in regard to the accuracy. The interference power is a physical quantity that is not affected by the fading environment or multipath environment of a mobile device, so in a fading environment or multipath environment, that precision of the ISCP deteriorates. Therefore, the SIR measurement precision of the F-DPCH deteriorates, and it becomes impossible to perform transmission power control with high enough precision to be able to obtain the target error rate as a target.

FIG. 20 is one example of a table for converting the Target TPC Command Error Rate (target error rate) to the SIR of the F-DPCH, and FIG. 21 is a graph that quantitatively shows the SIR and TPC Command Error Rate when the F-DPCH is received in a normal environment and in a fading environment, where A is the characteristics in a normal environment, and B is the characteristics in a fading environment. Using the table shown in FIG. 20, in a normal environment, it is possible to properly convert the Target TPC Command Error Rate to a target SIR, however in a fading environment, it is not possible to perform conversion correctly. For example, when the Target TPC Command Error Rate is $10^{-2}$, the target SIR in a normal environment is 0.7 dB, however, in a fading environment, the target SIR becomes 5 dB. Therefore, in a fading environment, the target SIR that should be set to 5 dB is set as 0.7 dB, and as a result, the base station is not able to perform proper power control of the F-DCPH, so a problem occurs in that the transmission to the mobile station is performed at a power greater than is necessary, radio communication resources are used to excess, and the due to this the throughput of the system drops. Moreover, in some cases, the F-DPCH may be transmitted at a power below the reception capability of the mobile station, and in such a case, a problem occurs in that the TPC Command Error Rate cannot be obtained as a target.

A technique has been disclosed as prior art in which reception quality is measured with good precision (see WO 2007/004292). In this prior art, reception quality that is calculated in the past is saved as a first reception quality, and the current reception quality is calculated as a second reception quality, the difference between the second reception quality and first reception quality is then calculated as a correction value, and the reception quality is corrected using this correction value.

However, this prior art is not a method for accurately measuring the RSCP (Received Signal Code Power) and ISCP (Interference on Signal Code Power) in the F-DPCH channel, or calculating the SIR correctly. Moreover, the prior art does not disclose a technique for accurately measuring the RSCP or ISCP in the F-DPCH channel. Furthermore, this prior art is not a method for performing transmission power control so that the desired error rate is obtained.

SUMMARY OF THE INVENTION

Taking the aforementioned problems into consideration, the object of the present invention is to accurately measure the RSCP (Received Signal Code Power) and ISCP (Interference on Signal Code Power) even in a fading environment.

Another object of the present invention is to accurately measure the SIR even in a fading environment, and to perform transmission power control so that a desired error rate can be obtained based on that SIR.

A further object of the invention is to set a target SIR according to a target error rate even in a fading environment, and perform transmission power control so that the target error rate can be obtained.

Reception Quality Measurement Method

A first form of the invention is a reception quality measurement method for a mobile station that receives F-DCPH symbols and CPICH symbols from a base station, comprising: a step of averaging a plurality of CPICH symbols in a time sequence before a certain time of interest and estimating the channel, then using the obtained channel estimation value and CPICH symbol at the time of interest to calculate the interference power ISCP; a step of averaging a plurality of CPICH symbols in a time sequence that include the CPICH symbol at the time of interest and estimating the channel, then using the obtained channel estimation value and the CPICH symbol at that time of interest to calculate a reference ISCP; a step of correcting the ISCP at the next time of interest using the difference between the ISCP and the reference ISCP; and a step of using the ISCP that is found from the correction and the RSCP of the F-DCPH symbol to calculate the signal to interference power ratio SIR of the mobile station.

The reception quality measurement method of the invention further comprises: a step of averaging a plurality of CPICH symbols in a time sequence before a certain time of interest and estimating the channel, then using the obtained channel estimation value and F-DCPH symbol at the time of interest to calculate the reception power RSCP of that symbol; a step of averaging a plurality of CPICH symbols in a time sequence that include the CPICH symbol at the time of interest and estimating the channel, then using the obtained channel estimation value and the F-DCPH symbol at that time of interest to calculate a reference RSCP; and a step of correcting the RSCP at the next time of interest using the difference between the RSCP and the reference RSCP.

The reception quality measurement method of the invention even further comprises a step of generating transmission power information based on the size of the calculated SIR and a target SIR, and sending that information to the base station.

Transmission Power Control Method

A second form of the invention is a transmission power control method for a mobile station that receives F-DCPH symbols and CPICH symbols from a base station.

A first form of the transmission power control method comprises: a step of averaging a plurality of CPICH symbols in a time sequence before a certain time of interest and estimating the channel, then using the obtained channel estimation value and CPICH symbol at the time of interest to calculate the interference power ISCP; a step of averaging a plurality of CPICH symbols in a time sequence that include the CPICH symbol at the time of interest and estimating the channel, then using the obtained channel estimation value and the CPICH symbol at that time of interest to calculate a reference ISCP; a step of setting a target error rate/target SIR correlation table based on the difference between the ISCP and the reference ISCP; a step of using that table to find a target SIR that corresponds to a target error rate; a step of using the RSCP and ISCP at the next time of interest to calculate the SIR; and a step of generating transmission power information based on the size of the calculated SIR and the target SIR, then sending that transmission power information to the base station.

A second form of the transmission power control method comprises: a step of averaging a plurality of CPICH symbols in a time sequence before a certain time of interest and estimating the channel, then using the obtained channel estimation value and F-DCPH symbol at the time of interest to calculate the reception power RSCP of that symbol; a step of averaging a plurality of CPICH symbols in a time sequence that include the CPICH symbol at the time of interest and estimating the channel, then using the obtained channel estimation value and the F-DCPH symbol at that time of interest to calculate a reference RSCP; a step of setting a target error rate/target SIR correlation table based on the difference between the RSCP and the reference RSCP; a step of using that table to find a target SIR that corresponds to a target error rate; a step of using the RSCP and ISCP at the next time of interest to calculate the SIR; and a step of generating transmission power information based on the size of the calculated SIR and said target SIR, then sending that transmission power information to the base station.

A third form of the transmission power control method comprises: a step of averaging a plurality of CPICH symbols in a time sequence before a certain time of interest and estimating the channel, using the obtained channel estimation value to perform channel compensation of the F-DCPH symbol at the time of interest, then decoding the channel compensated F-DCPH symbol and outputting the decoded result; a step of averaging a plurality of CPICH symbols in a time sequence that include the CPICH symbol at the time of interest and estimating the channel, using the obtained channel estimation value to perform channel compensation of the F-DCPH symbol at the time of interest, then decoding the channel compensated F-DCPH symbol and outputting a reference decoded result; a step of setting a target error rate/target SIR correlation table based on the decoding error rate that is obtained by comparing the decoded result and the reference decoded result; a step of using that table to find a target SIR that corresponds to a target error rate; a step of using the RSCP and ISCP at the next time of interest to calculate the SIR; and a step of generating transmission power information based on the size of the calculated SIR and the target SIR, then sending that transmission power information to the base station.

Reception Quality Measurement Device and Transmission Power Control Device

A third and fourth form of the invention is a reception quality measurement device and transmission power control device, where each is constructed so that it is capable of executing the respective reception quality measurement method and transmission power control method.

With this invention, it is possible to accurately measure the RSCP (Received Signal Code Power) and ISCP (Interference on Signal Code Power) even in a fading environment.

Moreover, with the present invention, it is possible to accurately measure the SIR even in a fading environment, and to perform transmission power control so that a desired error rate can be obtained based on that SIR.

Furthermore, with the present invention, by using a suitable conversion table, it is possible to set a target SIR that corresponds to a target error rate even in a fading environment, and it is possible to perform transmission power control so that that error rate is obtained.

In addition, with this invention, it is possible to improve the throughput of the system without having to transmit more power than is necessary from the base station to the mobile station, and without putting stress on the radio communication resources.

Other features and advantages of the present invention will be apparent from the following description taken in conjunction with the accompanying drawings.

BRIEF DESCRIPTION OF THE DRAWINGS

FIG. 6 is a correlation table that shows the relationship between the target error rate and target SIR of a third embodiment of the invention.

FIG. 8 is a correlation table that shows the relationship between the target error rate and target SIR of a fourth embodiment of the invention.

FIG. 10 is a correlation table that shows the relationship between the target error rate and target SIR of a fifth embodiment of the invention.

FIG. 20 is a drawing showing an example of a target TPC command error rate and target SIR conversion table.

DESCRIPTION OF THE PREFERRED EMBODIMENTS

(A) First Embodiment

(a) SIR Calculation Operation

A first embodiment of the invention improves the SIR measurement precision by accurately measuring the interference signal code power ISCP, and generates a transmission power control bit TPC so that a desired error rate can be obtained, and transmits that transmission power control bit TPC to a base station.

Figure 1:
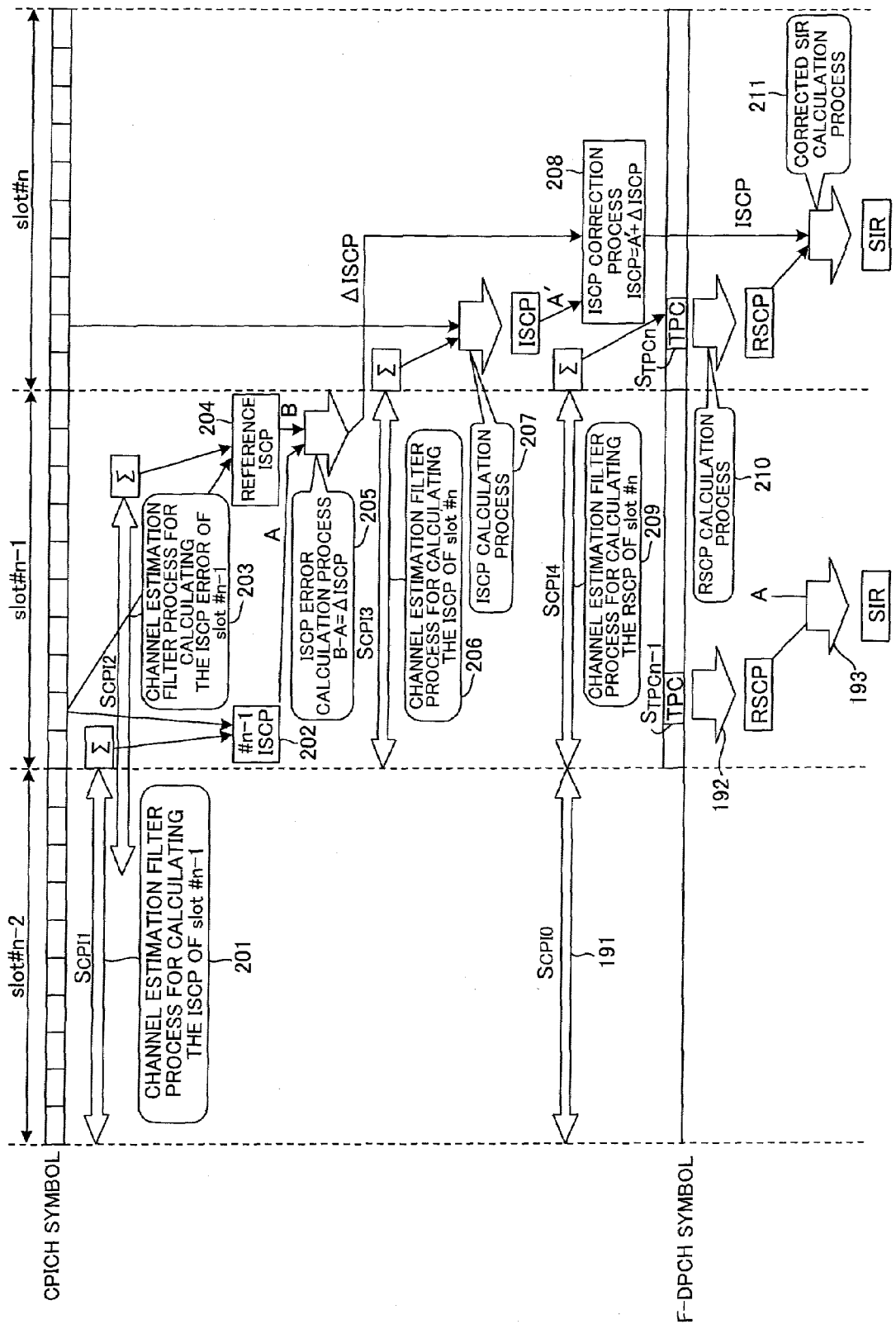
FIG. 1 is a drawing that explains the operation of the SIR measurement method of a first embodiment of the invention.

FIG. 1 is a drawing that explains the operation of the SIR measurement method of a first embodiment of the invention.

This method performs channel estimation using the ten CPICH symbols $S_{CPI1}$ that are immediately before the TPC symbol $S_{TPCn-1}$ in the (n−1)th slot that is transmitted from the base station (step 201), and uses that channel estimation value to measure the ISCP (=A) at the reception time of the TPC symbol $S_{TPCn-1}$ (step 202). This ISCP (Interference on Signal Code Power) includes error since it uses the past channel estimation value.

Next, the method uses ten CPICH symbols $S_{CPIn2}$ that are centered around the reception time of the TPC symbol $S_{TPCn-1}$ to estimate the channel at the reception time of the TPC symbol $S_{TPCn-1}$ (step 203), then uses the channel estimation value to measure the ISCP (=B) at the reception time of the TPC symbol $S_{TPCn-1}$ as a reference ISCP (step 204). This reference ISCP does not include error since it uses the channel estimation value at the reception time of the TPC symbol $S_{TPCn-1}$.

Next, the method finds the difference ΔISCP between the first ISCP (=A) and the second ISCP, which is a reference ISCP (=B), that are found in the steps above, as a correction ISCP according to the following equation (step 205).

$$B - A = \Delta ISCP \quad (1)$$

At the same time, the method performs channel estimation using the ten CPICH symbols $S_{CPI3}$ that are immediately before the TPC symbol $S_{TPCn}$ in the nth slot that is transmitted from the base station (step 206), and uses that channel estimation value to measure the ISCP (=A') at the reception time of the TPC symbol $S_{TPCn}$ (step 207). This ISCP includes error since a past channel estimation value is used. Next, the method uses ΔISCP to correct the ISCP according to the equation below (step 208).

$$ISCP = A' + \Delta ISCP \quad (2)$$

In other words, the error ΔISCP at the reception time of the TPC symbol $S_{TPCn-1}$ in the previous (n−1)th slot can be regarded as being nearly the same as the error at the reception time of the TPC symbol $S_{TPCn}$ in the current nth slot, so the ISCP is corrected by the equation above.

Moreover, the method performs channel estimation of the F-DPCH using the ten CPICH symbols $S_{CPI4}$ that are immediately before the TPC symbol $S_{TPCn}$ in the nth slot that is transmitted from the base station (step 209), and uses that channel estimation value to perform channel compensation of the F-DPCH symbol signal (TPC symbol $S_{TPCn}$) after which the method calculates the RSCP (Received Signal Code Power) of that TPC symbol $S_{TPCn}$ (step 210).

Finally, the method uses the ISCP that was corrected in step 208 and the RSCP that was obtained in step 210 to calculate the SIR at the reception time of the TPC symbol $S_{TPCn}$ according to the equation below (step 211).

$$SIR = RSCP/ISCP \quad (3)$$

After that, the method uses this SIR to perform control to generate a transmission power control bit TPC.

A suitable correction ISCP can also be obtained by multiplying (B−A) by a coefficient α.

$$\alpha \times (B - A) = \Delta ISCP \quad (1)$$

(b) Mobile Station

Figure 2:
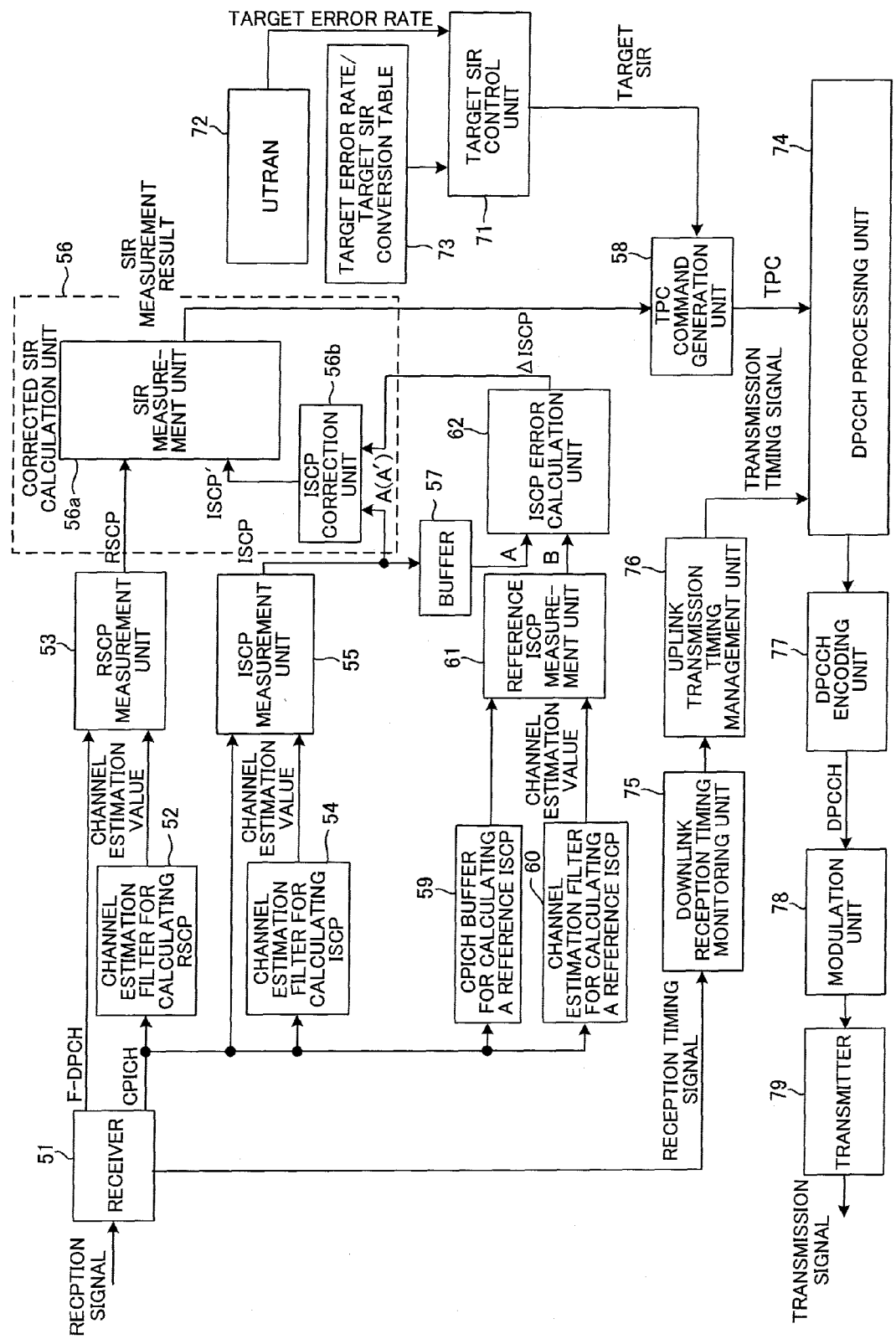
FIG. 2 is a drawing showing the construction of the mobile station of a first embodiment of the invention.

FIG. 2 is a drawing showing the construction of a mobile station of a first embodiment of the invention.

A radio signal that is transmitted from a base station is received by an antenna and input to a receiver 51. After performing down conversion of the radio signal to a baseband signal, the receiver 51 performs processing such as quadrature modulation, AD conversion and inverse spreading of the obtained baseband signal, and outputs a F-DPCH symbol signal, a CPICH symbol signal, and a reception timing signal (frame synchronization signal, slot synchronization signal). Currently, the receiver 51 receives the F-DPCH and CPICH in the (n−1)th slot.

A channel estimation filter 52 for calculating the RSCP always saves the ten most recent CPICH symbols that are immediately before the currently received symbol, and uses these CPICH symbols to estimate the F-DPCH channel. Therefore, when the TPC symbol $S_{TPCn-1}$ in the (n−1)th slot is received from the base station, the channel estimation filter 52 uses the ten CPICH symbols SCPI0 to estimate the channel (step 191 in FIG. 1), and a RSCP measurement unit 53 uses that channel estimation value to perform channel compensation on the TPC symbol $S_{TPCn-1}$, and then calculates and outputs the RSCP of that TPC symbol $S_{TPCn-1}$ (step 192).

Similarly, a channel estimation filter 54 for calculating the ISCP always saves the most recent ten CPICH symbols that are immediately before the currently received symbol, and uses these CPICH symbols to perform channel estimation. Therefore, when the TPC symbol $S_{TPCn-1}$ in the (n−1)th slot is received from the base station, the channel estimation filter 54 uses the ten CPICH symbols $S_{CPI1}$ that are immediately before it to perform channel estimation (step 201), then an ISCP measurement unit 55 calculates reception power ISCP (=A) of the interference signal using the CPICH symbol that is received at the same time as the TPC symbol $S_{TPCCn-1}$, an already known CPICH symbol and the channel estimation value input from the channel estimation filter 54, and together with inputting the result to a ISCP correction unit 56b of a corrected SIR calculation unit 56, saves it in a buffer 57 (step 202).

In the (n−1)th slot, when the correction value ΔISCP of Equation (1) is not obtained, or in other words, when ΔISCP=0, a SIR measurement unit 56a of the corrected SIR calculation unit 56 uses the RSCP and ISCP (=A) that are input from the RSCP measurement unit 53 and ISCP measurement unit 55, and calculates the SIR according to Equation (3), then inputs the result to a TPC command generation unit 58 (step 193).

On the other hand, after a TPC error rate has been set by the UTRAN 72 as a target, a target SIR control unit 71 make a reference to a target error rate/target SIR conversion table 73 and finds a target SIR that corresponds to the target error rate, and inputs that target SIR to the TPC command generation unit 58.

The TPC command generation unit 58 decides a TPC command (Up or Down) based on the size of the SIR measurement result and target SIR, and inputs that TPC command to a DPCCH processing unit 74. Moreover, a downlink reception timing monitoring unit 75 monitors the downlink timing based on the reception timing signal (frame synchronization signal, slot synchronization signal), and a uplink transmission timing management unit 76 inputs a transmission timing signal to the DPCCH processing unit 74. The DPCCH processing unit 74 performs time division multiplexing of the Pilot, TFCI, FBI and TPC of the uplink DPCCH, and in synchronization with the transmission timing signal, outputs a DPCCH symbol. A DPCCH encoding unit 77 encodes the input DPCCH symbol, a modulation unit 78 modulates the DPCCH and other uplink channels, and a transmitter 79 converts the modulated signal to a radio signal and transmits it toward the base station.

At the same time as this, a CPICH buffer 59 for calculating a reference ISCP saves the CPICH symbol that was received at the same time that the TPC symbol $S_{TPCn-1}$ was received, and a channel estimation filter 60 for calculating a reference ISCP saves the ten most recent CPICH symbols, which are delayed a few symbols (7 symbols in the figure) from the ten CPICH symbols stored in the channel filter 54 for calculating the ISCP, in order in an internal buffer. When the CPICH symbol that is received at the same time as the TPC symbol $S_{TPCn-1}$ is saved in the middle location of that buffer, the channel estimation filter 60 for calculating the reference ISCP uses the ten CPICH symbols $S_{CPI2}$ to estimate the channel (step 203). This channel estimation value is the channel estimation value at the time that the TPC symbol $S_{TPCn-1}$ is received.

Next, a reference ISCP measurement unit 61 calculates the ISCP (=B) of the interference signal using the CPICH symbol (stored in the buffer 59 for calculating the reference ISCP) that is received at the same time as the TPC symbol $S_{TPCn-1}$, an already known CPICH symbol, and the channel estimation value that was found in step 203, and inputs the result to an ISCP error calculation unit 62 as a reference ISCP (step 204). This reference ISCP does not include error since it uses the channel estimation value at the reception timing of the TPC symbol $S_{TPCn-1}$.

The ISCP error calculation unit 62 computes the difference ΔISCP between the ISCP (=A) and reference ISCP (=B) according to Equation (1) (step 205), and inputs the result to the ISCP correction unit 56b of the correction SIR calculation unit 56.

In this state, the channel estimation filter 54 for calculating the ISCP uses the ten CPICH symbols $S_{CPI3}$ that are immediately before the reception time of the TPC symbol $S_{TPCn}$ in the nth slot that is sent from the base station to perform channel estimation (step 206), and the ISCP measurement unit 55 calculates the reception power ISCP of the interference signal using the CPICH symbol that is received at the same time that the TPC symbol $S_{TPCn}$ is received, an already known CPICH symbol and the channel estimation value that is estimated in step 206 (step 207), and together with inputting the result to the ISCP correction unit 56b as A', saves that ISCP in the buffer 57 as A. This ISCP includes error since it uses a past channel estimation value.

The ISCP correction unit 56b uses the difference ΔISCP that is input from the ISCP error calculation unit 62 to correct the ISCP according to Equation (2) (step 208).

Moreover, when the TPC symbol $S_{TPCn}$ in the nth slot is received from the base station, the channel estimation filter 52 for calculating the RSCP uses the immediately preceding ten CPICH symbols $S_{CPU4}$ to perform channel estimation (step 209), and the RSCP measurement unit 53 uses that channel estimation value to perform channel compensation of the TPC symbol $S_{TPCn}$, after which RSCP measurement unit 53 calculates and outputs the RSCP of that TPC symbol $S_{TPCn}$ (step 210).

The SIR measurement unit 56a of the corrected SIR calculation unit 56 uses the RSCP and ISCP that are input from the RSCP measurement unit 53 and ISCP correction unit 56b to calculate the SIR according to Equation (3), and inputs that SIR to the TPC command generation unit 58 (step 211). The TPC generation unit 58 uses this SIR and the target SIR to perform control to generate a transmission power control bit TPC.

After that, the SIR calculation process and TPC bit generation process are performed as described above.

With this first embodiment, it is possible to accurately measure the ISCP and to calculate a correct SIR, and thus it is possible to generate a TPC bit so that a desired error rate is obtained.

(B) Second Embodiment (a) SIR Calculation Operation

The first embodiment improves the measurement precision of the SIR by accurately measuring the ISCP, and generates a transmission power control bit TPC so that a desired error rate is obtained and sends that TPC to a base station. This second embodiment improves the measurement precision of the SIR by accurately measuring the RSCP, and generates a transmission power control bit TPC so that a desired error rate is obtained and sends that TPC to a base station. By combining the first and second embodiments, it is possible to calculate the SIR even more accurately.

Figure 3:
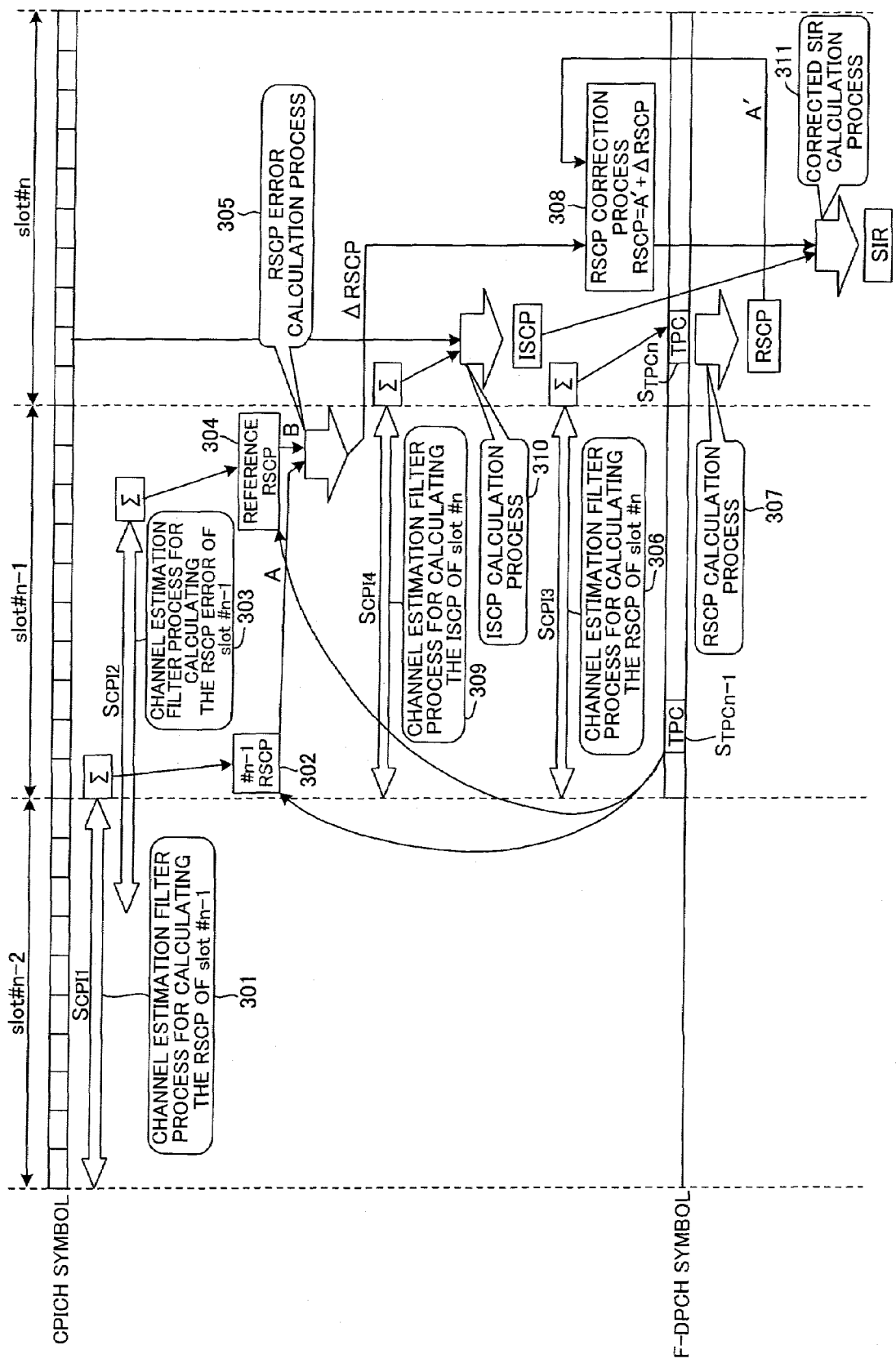
FIG. 3 is a drawing that explains the operation of the SIR measurement method of a second embodiment of the invention.

FIG. 3 is a drawing that explains the operation of the SIR measurement method of this second embodiment.

This method uses ten CPICH symbols $S_{CPI1}$ that are immediately before the TPC symbol $S_{TPCn-1}$ in the (n−1)th slot that is sent from the base station to perform channel estimation (step 301), then uses that channel estimation value to perform channel compensation of the TPC symbol $S_{TPCn-1}$, after which it measures the RSCP (=A) of that TPC symbol (step 302). This RSCP includes error since it uses a past channel estimation value.

Next, the method uses the ten CPICH symbols $S_{CPIn2}$ that are centered around the reception timing of the aforementioned TPC symbol $S_{TPCn-1}$ to perform channel estimation at the reception timing of that TPC symbol $S_{TPCn-1}$ (step 303), then uses that channel estimation value to perform channel compensation of the TPC symbol $S_{TPCn-1}$ and measures the RSCP (=B) of that TPC symbol as a reference RSCP (step 304). This reference RSCP does not include error since it uses the channel estimation value at the reception timing of the TPC symbol $S_{TPCn-1}$.

The method uses the equation below to find the difference ΔRSCP between the first RSCP (=A) and the second RSCP, or in other words the reference RSCP (=B), that were found in the steps described above as a correction RSCP (step 305).

$$B - A = \Delta RSCP \qquad (4)$$

At the same time as this, the method uses the ten CPICH symbols $S_{CPI3}$ that are immediately before the TPC symbol $S_{TPCn}$ in the nth slot that is transmitted from the base station to perform channel estimation (step 306), then uses that channel estimation value to perform channel compensation of the TPC symbol $S_{TPCn}$, and measures the RSCP (=A') of that TPC symbol (step 307). This RSCP includes error since it uses a past channel estimation value. Next, the method uses the difference ΔRSCP that is obtained in step 305 and corrects the RSCP according to the equation below (step 308).

$$RSCP = A' + \Delta RSCP \quad (5)$$

In other words, the error ΔRSCP at the time that the TPC symbol $S_{TPCn-1}$ in the previous (n−1)th slot is received can be regarded as being nearly equivalent to the error at the time that the TPC symbol $S_{TPCn}$ in the current nth slot is received, so RSCP is corrected by the equation above.

Moreover, the method uses the ten CPICH symbols $S_{PCI4}$ that are immediately before the reception time of the TPC symbol $S_{TPCn}$ in the nth slot that is transmitted from the base station to perform channel estimation (step 309), then uses that channel estimation value, the CPICH symbol at the reception time of the TPC symbol $S_{TPCn}$, and an already known CPICH symbol to calculate the ISCP of the interference signal (step 310).

Finally, the method uses the RSCP that was corrected in step 308 and the ISCP that was found in step 310 to calculate the SIR at the reception timing of the TPC symbol $S_{TPCn}$ (step 311). After that, the method uses this SIR to perform control to generate a transmission power control bit TPC.

Instead of the using Equation (4), it is also possible to obtain a suitable correction RSCP according to the equation below, or in other words, by multiplying (B−A) by a coefficient β.

$$\beta \times (B-A) = \Delta RSCP \quad (4)$$

(b) Mobile Station

Figure 4:
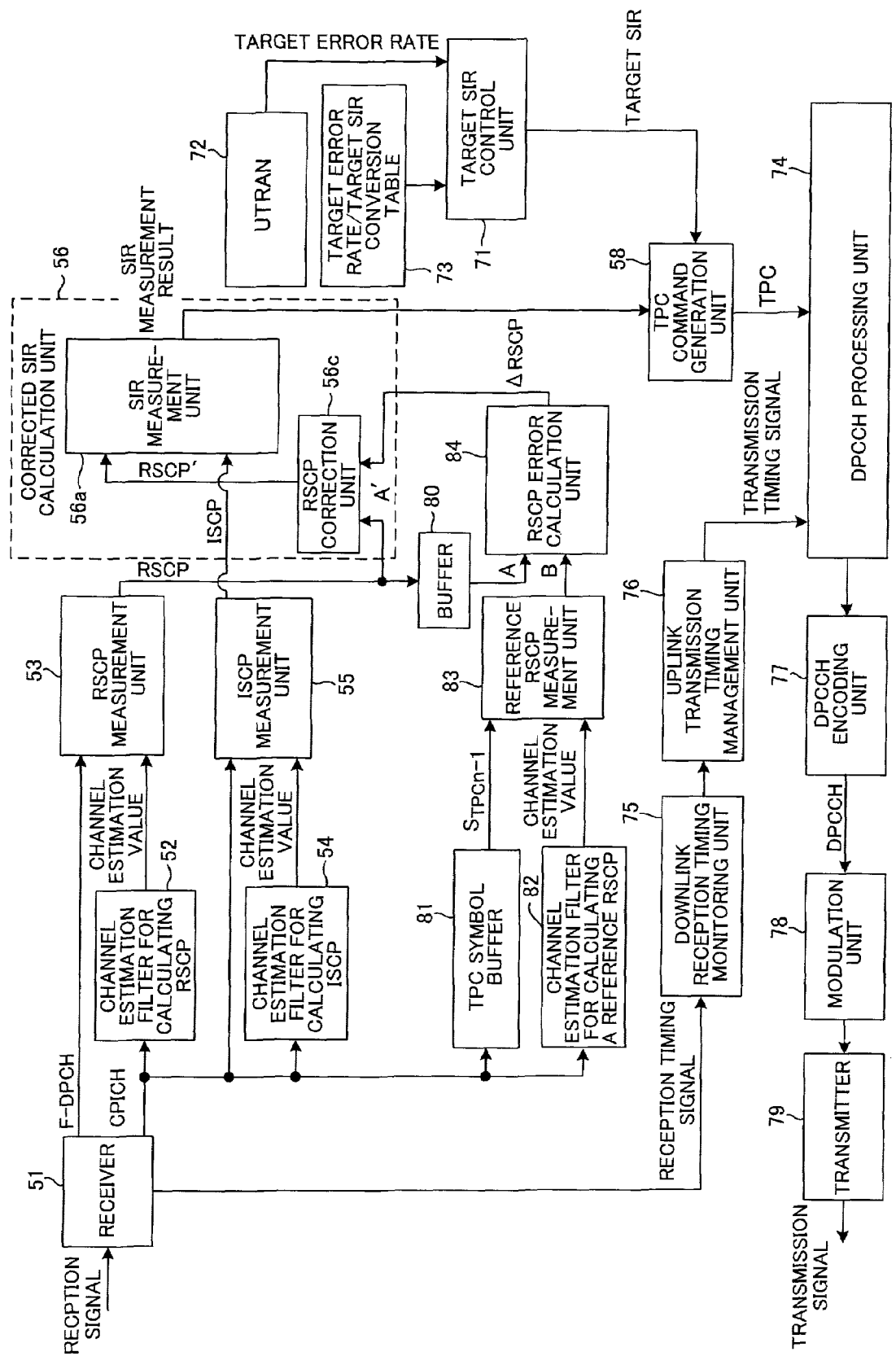
FIG. 4 is a drawing showing the construction of the mobile station of a second embodiment of the invention.

FIG. 4 is a drawing showing the construction of a mobile station of this second embodiment, where the same reference numbers are given to parts that are identical to those in the first embodiment shown in FIG. 2. This embodiment differs by the point given below.

(1) A buffer 80 stores the RSCP that was measured by the RSCP measurement unit 53 as A.

(2) A TPC symbol buffer 81 stores the TPC symbol $S_{TPCn-1}$ that was received in the previous slot.

(3) A channel estimation filter 82 for calculating a reference RSCP stores the ten most recent CPICH symbols which are delayed a few symbols, for example n/2 (=5) symbols from those of the channel estimation filter 52 for calculating the RSCP, in order, and performs channel estimation at the reception time of the TPC symbol $S_{TPCn-1}$ using the stored CPICH symbols.

(4) A reference RSCP measurement unit 83 performs channel compensation of the TPC symbol $S_{TPCn-1}$, and then outputs the RSCP of that TPC symbol as B.

(5) A RSCP error calculation unit 84 calculates the correction RSCP (=A RSCP) according to Equation (4).

(6) A RSCP correction unit 56c corrects the RSCP according to Equation (5), and the SIR measurement unit 56a measures the SIR according to Equation (3).

With this second embodiment, it is possible to accurately measure the RSCP and to calculate a correct SIR, and thus it is possible to generate a TPC bit so that a desired error rate can be obtained. Particularly, by combining the first and second embodiments, it is possible to calculate the SIR even more accurately.

(C) Third Embodiment

In the first and second embodiments, the ISCP and RSCP are accurately calculated, and as a result, the SIR is measured with good precision even in a fading environment, and a TPC bit is set so that a desired error rate is obtained. In the third thru fifth embodiments described below, a conversion table (target error rate/target SIR conversion table) is selected to correspond with a fading environment, and a TPC bit is decided so that a desired error rate is obtained.

Figure 5:
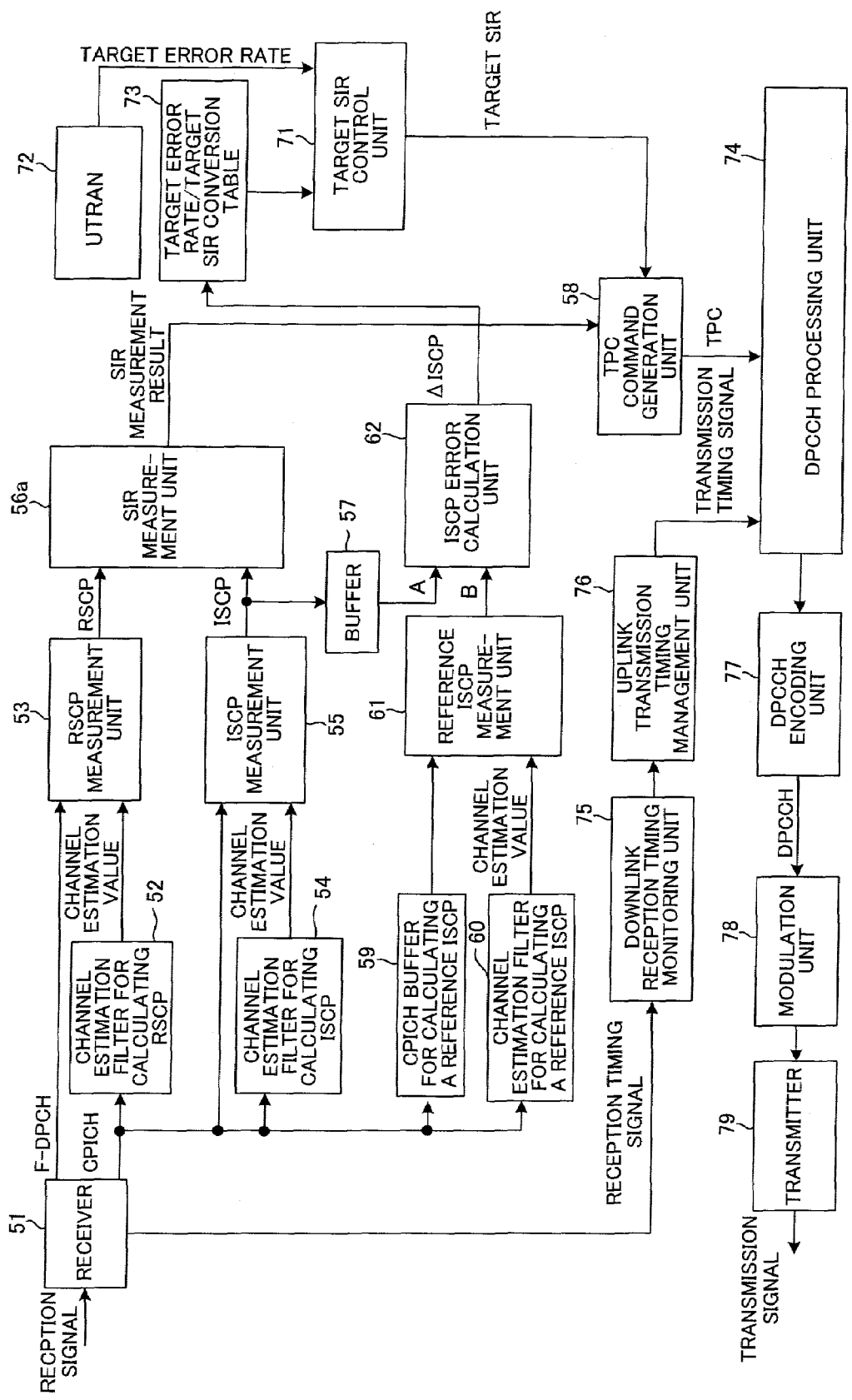
FIG. 5 is a drawing showing the construction of the mobile station of a third embodiment of the invention.

FIG. 5 is a drawing showing the construction of a mobile station of a third embodiment of the invention, where the same reference numbers are given to parts that are identical to those in the first embodiment shown in FIG. 2. This embodiment differs by the points described below.

(1) A suitable target error rate/target SIR conversion table is selected based on ΔISCP that was obtained according to Equation (1), and base on that conversion table, the target SIR control unit 71 sets a target SIR to correspond with the target error rate, and inputs that target SIR to the TPC command generation unit 58.

(2) The SIR measurement unit 56a uses the RSCP and ISCP that are input from the RSCP measurement unit 53 and ISCP measurement unit 55 to calculate the SIR, then inputs that SIR to the TPC command generation unit 58, and the TPC command generation unit uses the target SIR and the calculated SIR to decide the TPC bit.

Figure 21:
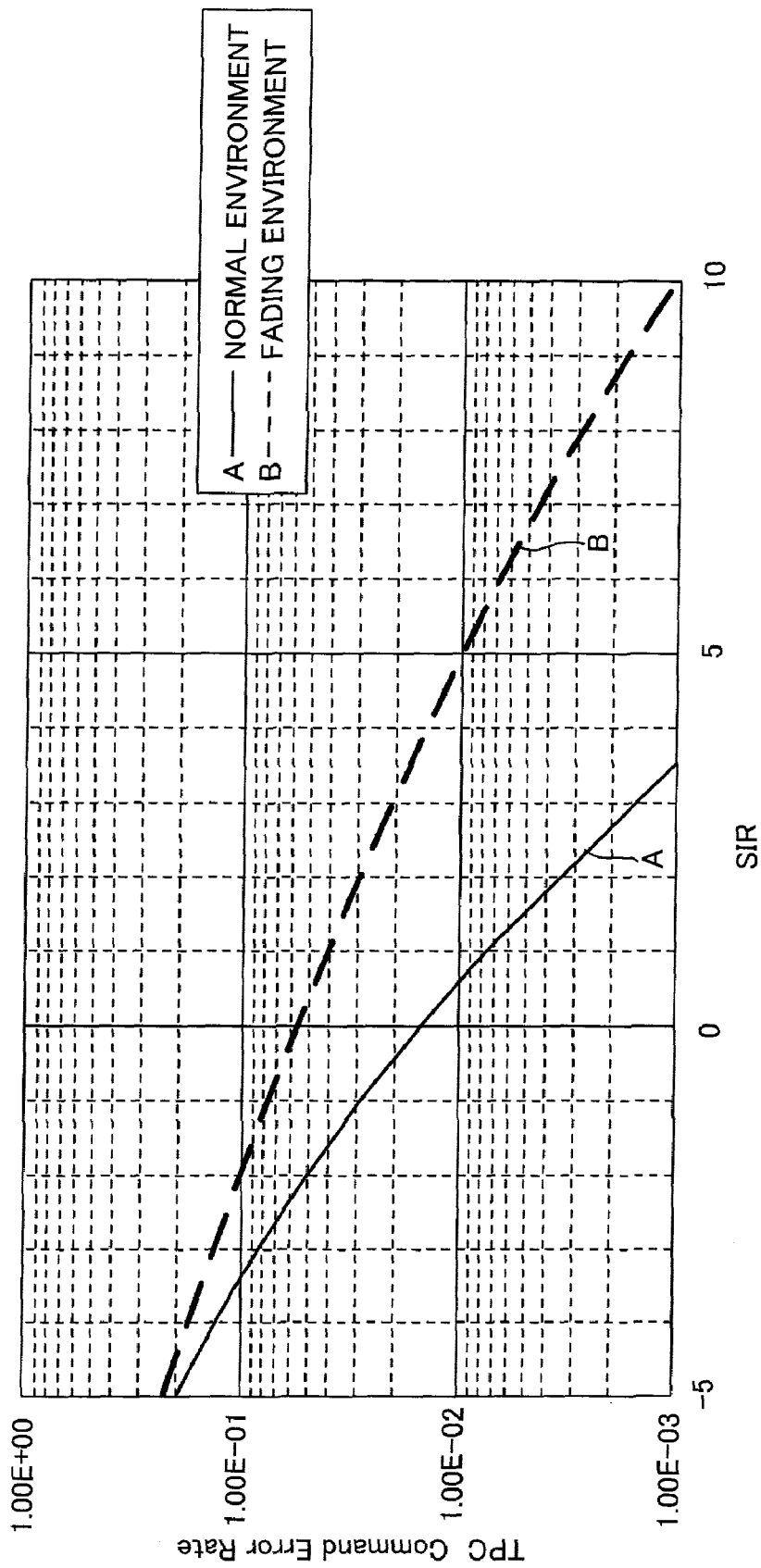
FIG. 21 is a drawing showing the characteristics of the target TPC command error rate and target SIR.
Figure 22:
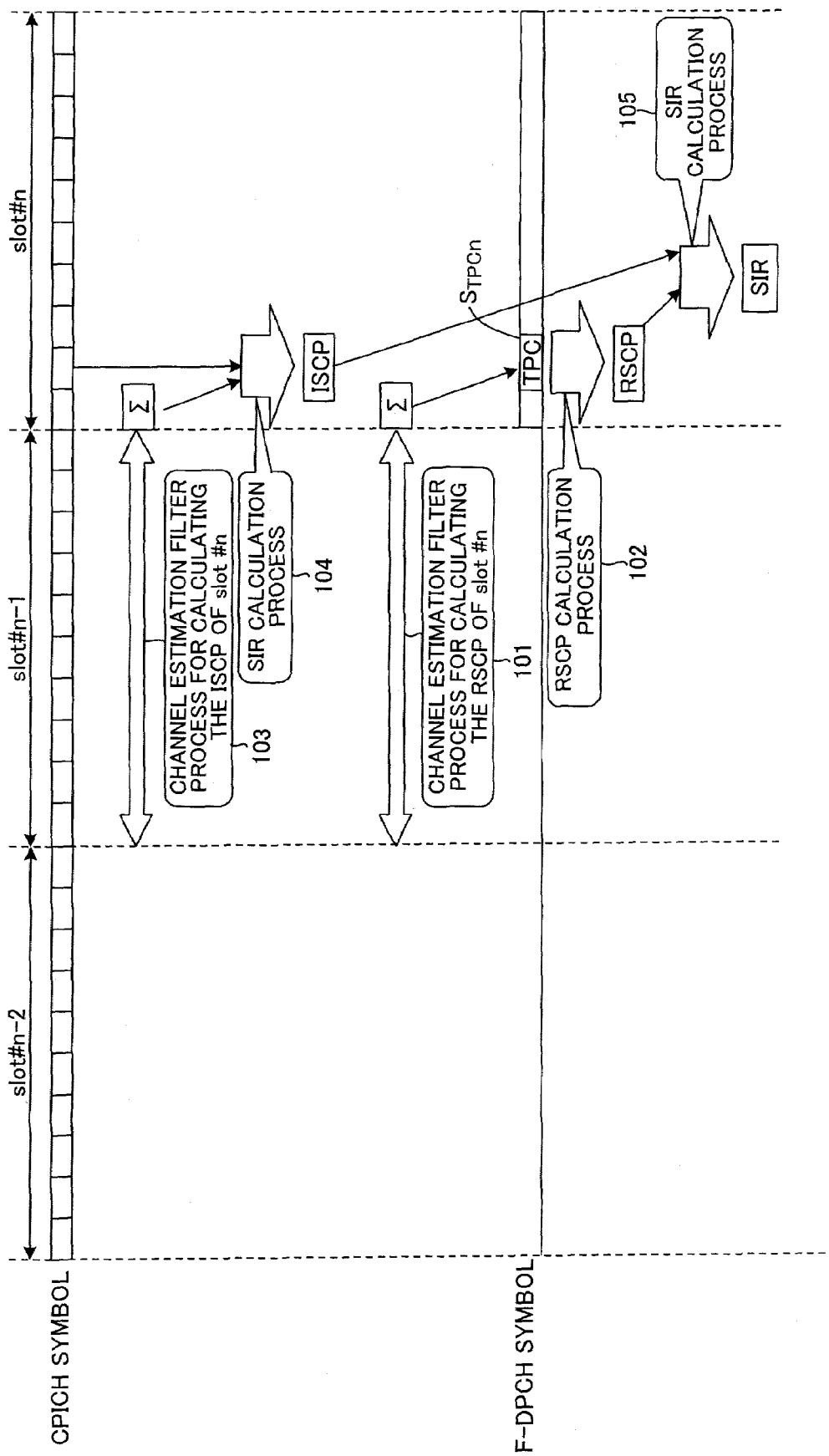
FIG. 22 is a drawing that shows a timechart image in symbol units of the process for calculating the ISCP, RSCP and SIR in a F-DPCH.

As was explained using FIG. 21, the relationship between the target SIR and target error rate in a normal environment differs from the relationship between the target SIR and target error rate in a fading environment. Therefore, as shown n FIG. 6, a plurality of target error rate/target SIR conversion tables 73a to 73c are prepared in advance in a conversion table unit 73 according to the value of the ISCP error (ΔISCP), and the conversion table unit 73 decides a table in the target SIR control unit 71 according to the error ΔISCP. The target SIR control unit 71 decided the set table to set a target SIR according to the target error rate, and inputs that target SIR to the TPC command generation unit 58.

With this third embodiment, by using a suitable table, it is possible to decide a TPC bit so that a desired error rate is obtained.

(D) Fourth Embodiment

Figure 7:
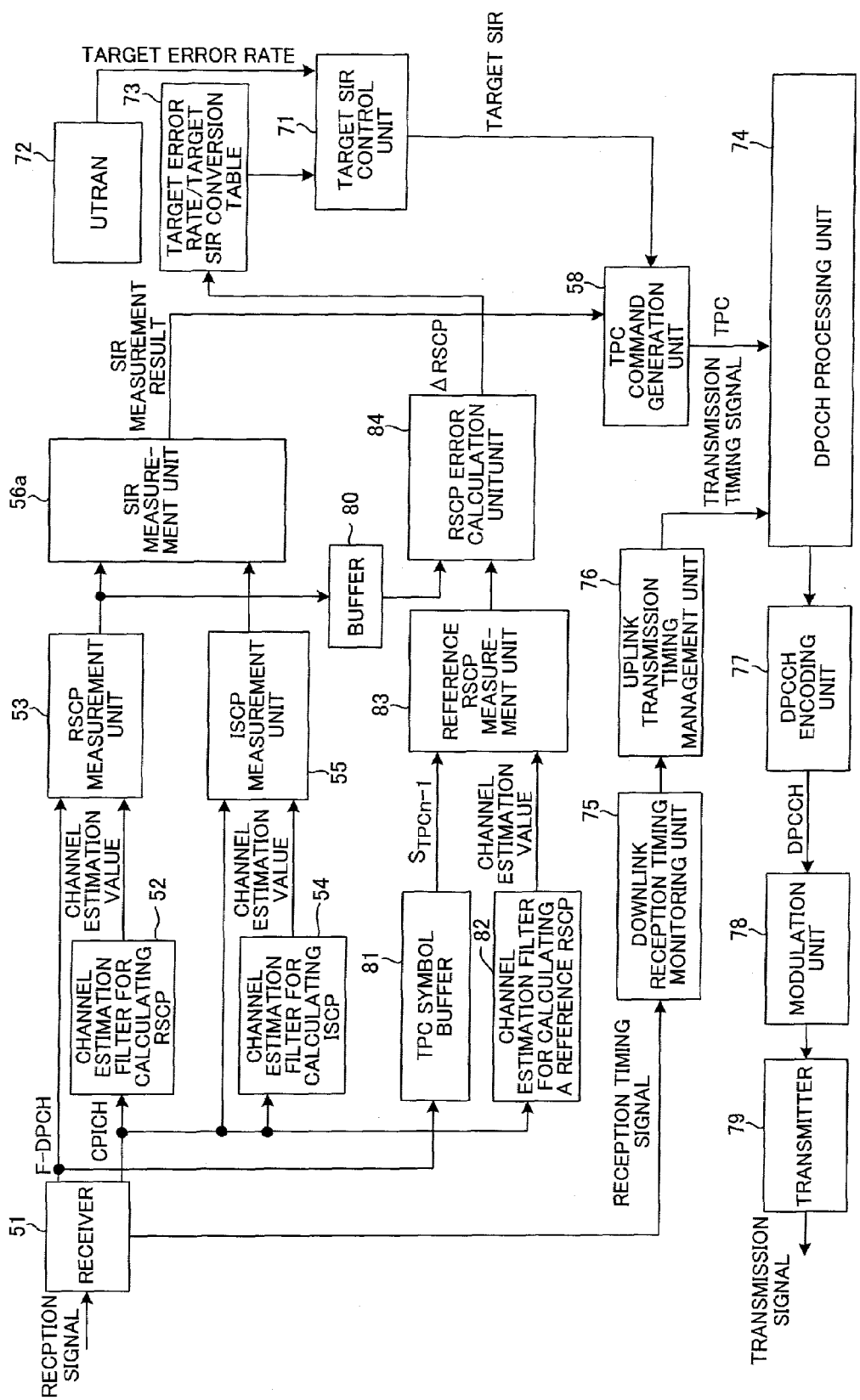
FIG. 7 is a drawing showing the construction of the mobile station of a fourth embodiment of the invention.

FIG. 7 is a drawing showing the construction of a mobile station of a fourth embodiment of the invention, where the same reference numbers are given to parts that are identical to those of the second embodiment shown in FIG. 4. This embodiment differs in points given below.

(1) A suitable target error rate/target SIR conversion table is selected based on ΔRSCP that is obtained according to Equation (4), and based on that conversion table, the target SIR control unit 71 sets a target SIR that corresponds to the target error rate, and inputs that target SIR to the TPC command generation unit 58.

(2) The SIR measurement unit 56a uses the RSCP and ISCP that are input from the RSCP measurement nit 53 and ISCP measurement unit 55 to calculate the SIR, then inputs that SIR to the TPC command generation unit 58, and the TPC command generation unit 58 uses the target SIR and calculated SIR to decide a TPC bit.

As explained using FIG. 21, the relationship between the target SIR and target error rate in a normal environment differs from the relationship between the target SIR and target error rate in a fading environment. Therefore, as shown in FIG. 8, a plurality of target error rate/target SIR conversion tables 73a' to 73c' are prepared in advance in a conversion table unit 73 according to the value of the RSCP error (ΔRSCP), and the conversion table unit 73 decides a table in the target SIR control unit 71 according to the error ΔRSCP. The target SIR control unit 71 uses the decided table to set a target SIR according to the target error rate, and inputs that target SIR to the TPC command generation unit 58.

With this fourth embodiment, by using a suitable table, it is possible to decide a TPC bit so that a desired error rate is obtained.

(E) Fifth Embodiment

Figure 9:
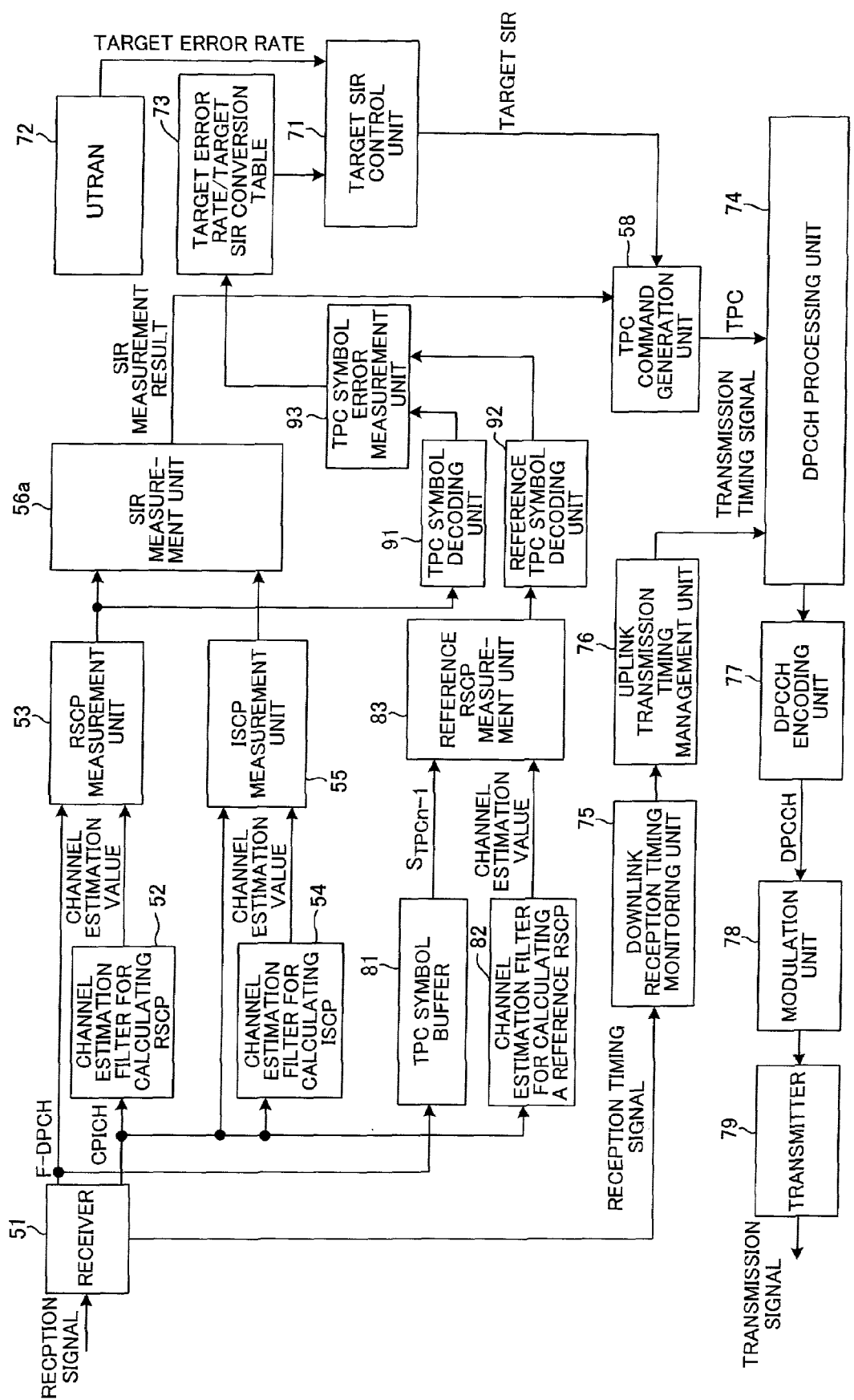
FIG. 9 is a drawing showing the construction of the mobile station of a fifth embodiment of the invention.
Figure 11:
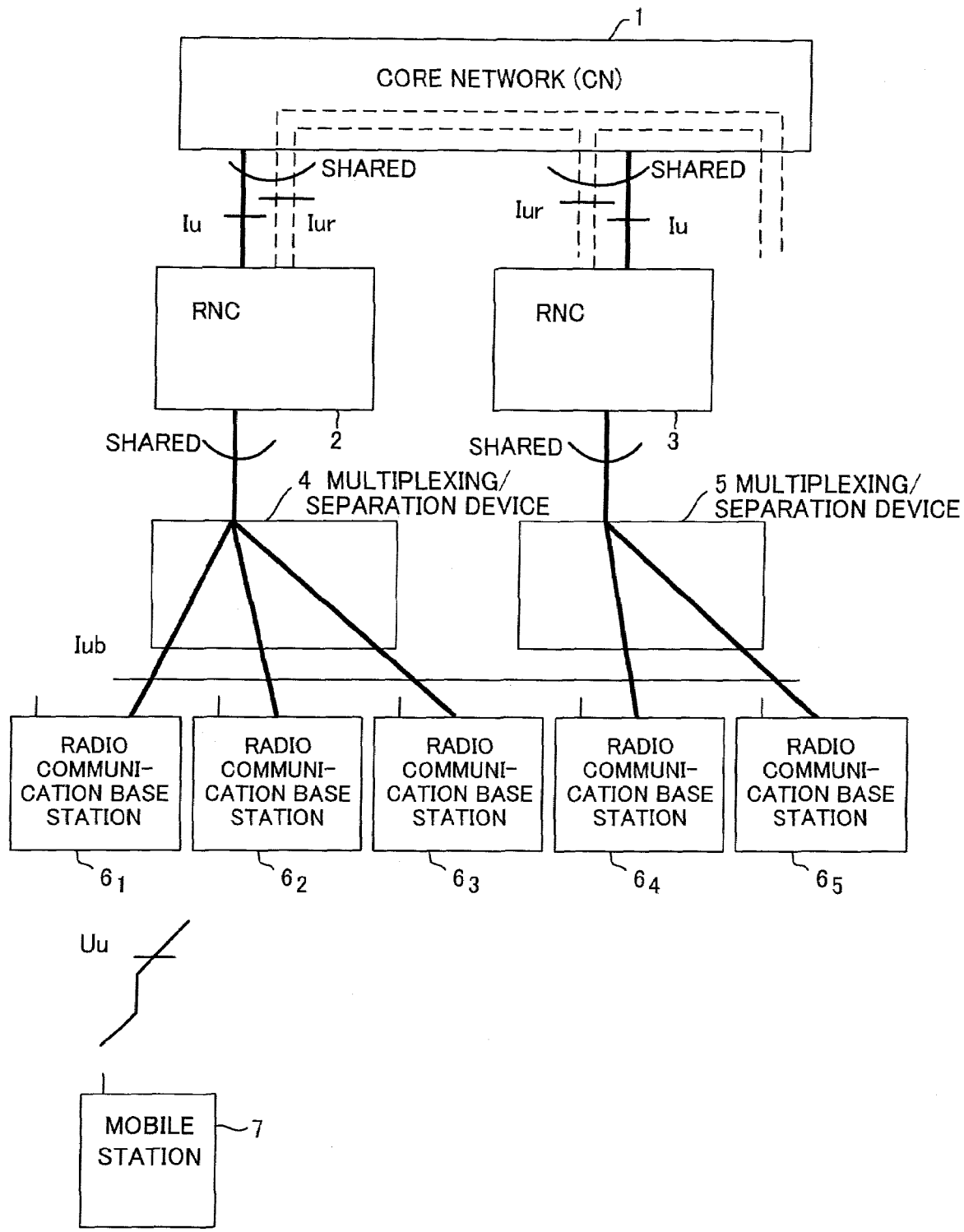
FIG. 11 is a drawing showing a W-CDMA mobile communication system.
Figure 12:
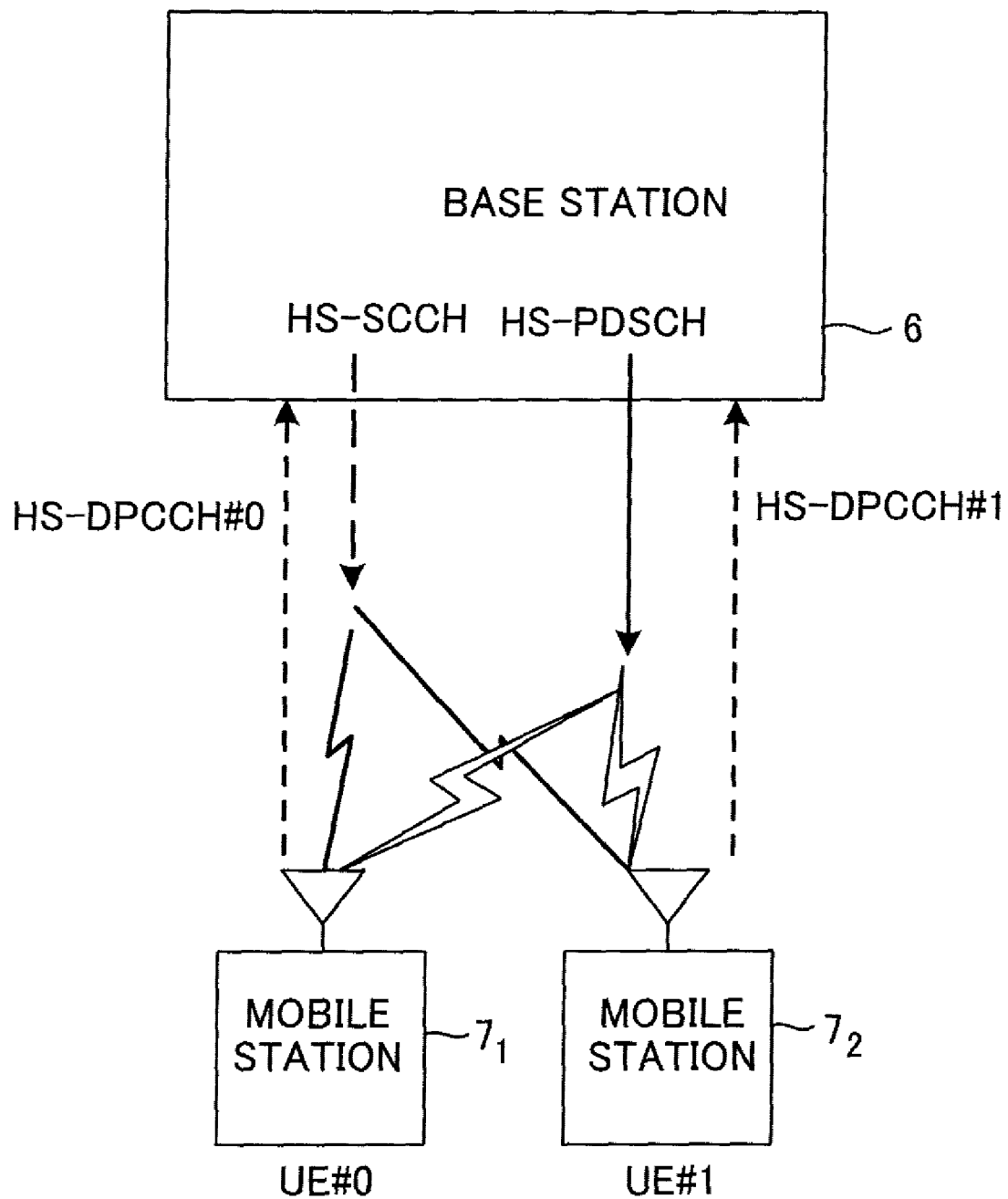
FIG. 12 is a drawing that explains the main radio communication channels that are used in HSDPA.
Figure 13:
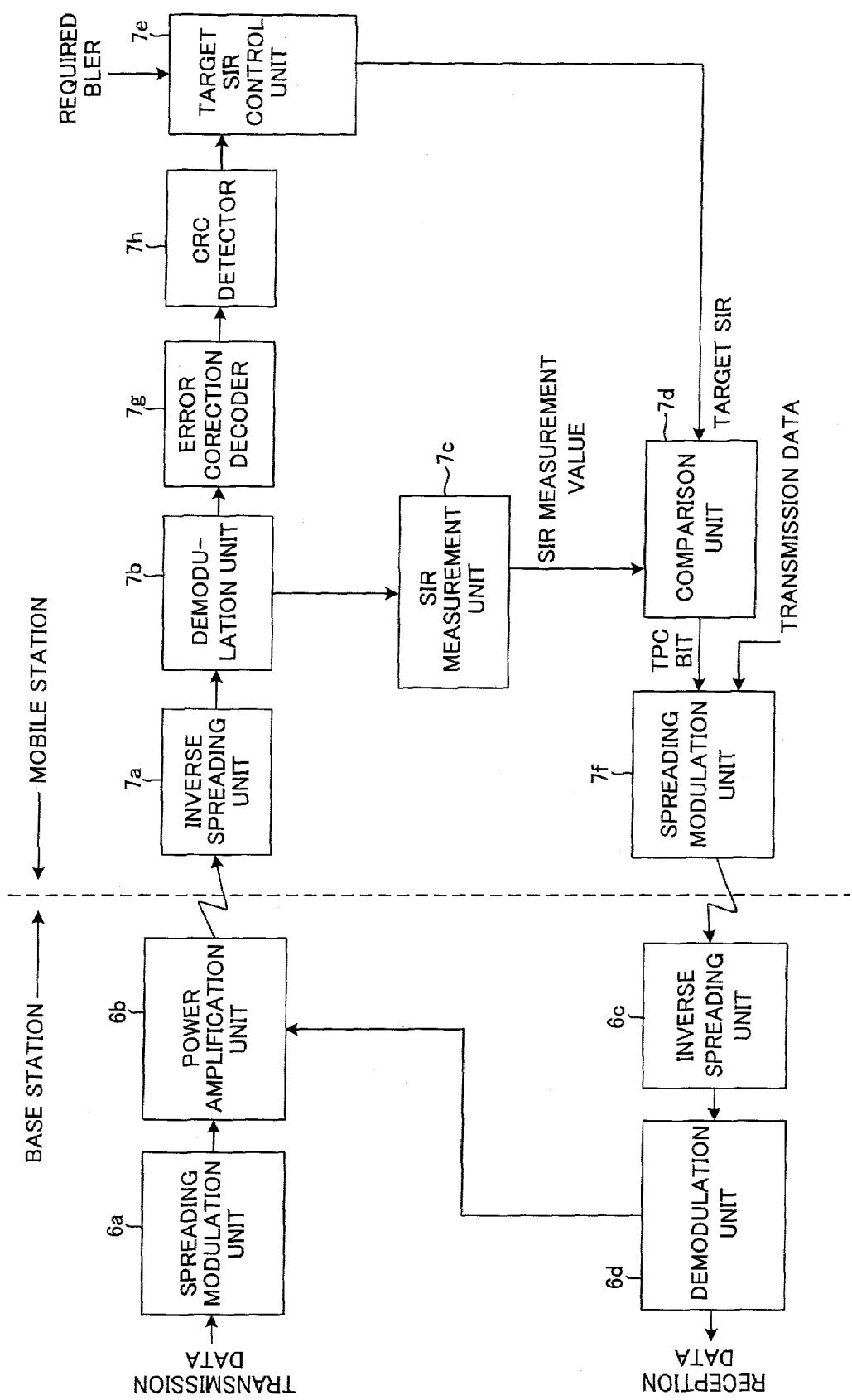
FIG. 13 is a drawing that explains transmission power control of a mobile station.
Figure 14:
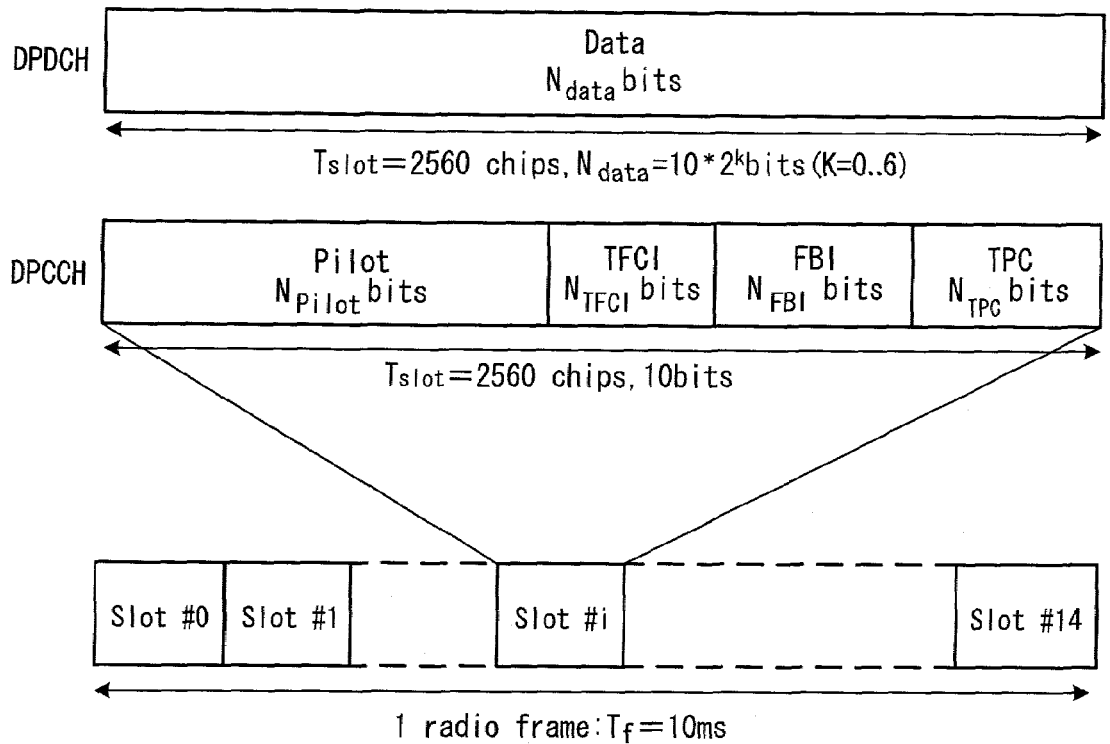
FIG. 14 is a drawing showing the configuration of a frame of an uplink individual physical channel DPCH.
Figure 15:
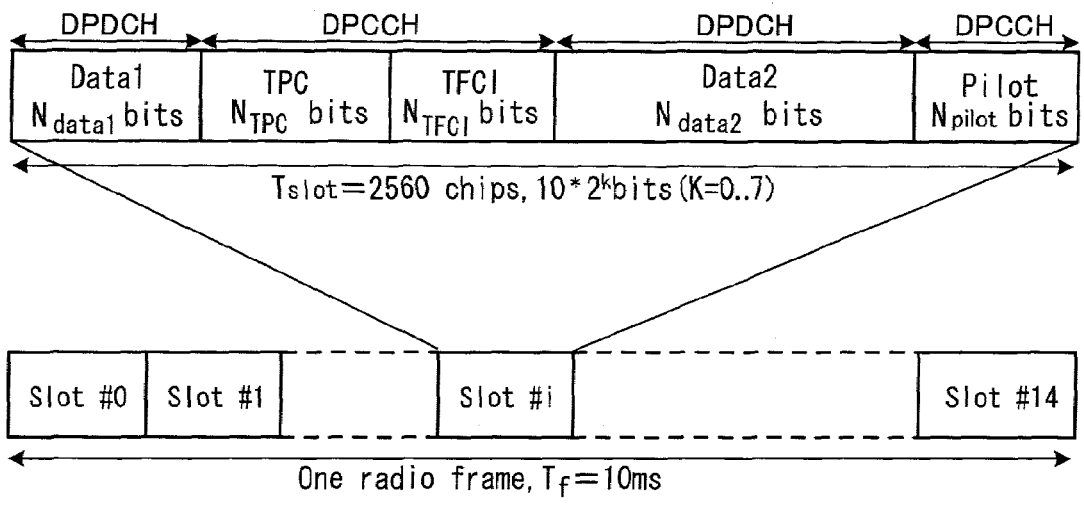
FIG. 15 is a drawing showing an example of the format of an individual channel DPCH in a downlink from a base station to a mobile station.
Figure 16:
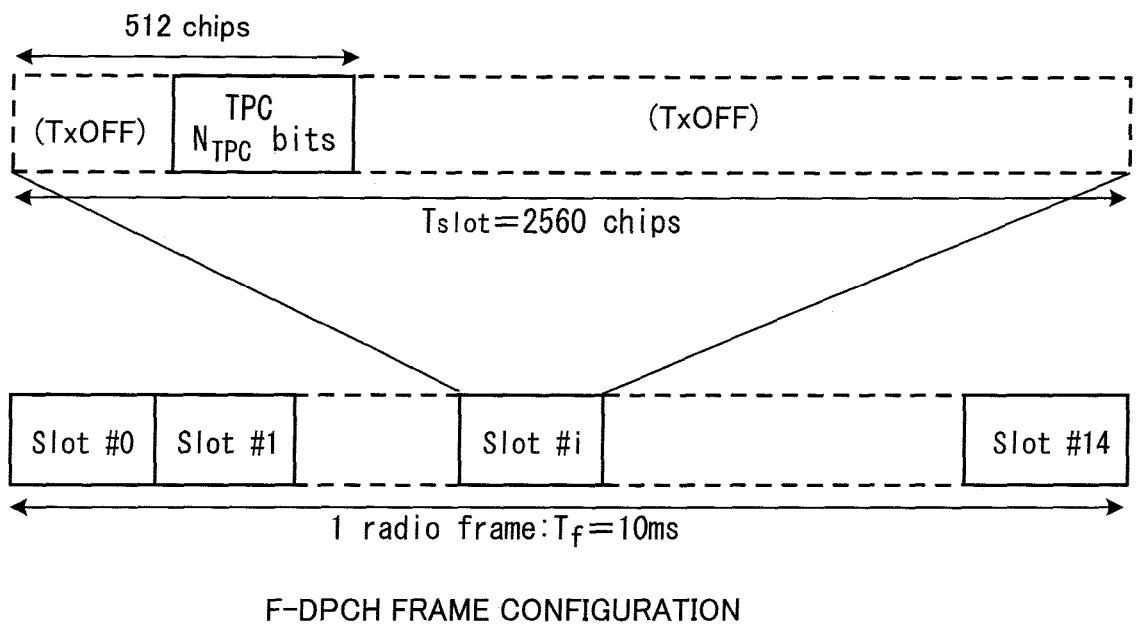
FIG. 16 is a drawing showing an example of format of a F-DPCH.
Figure 17:
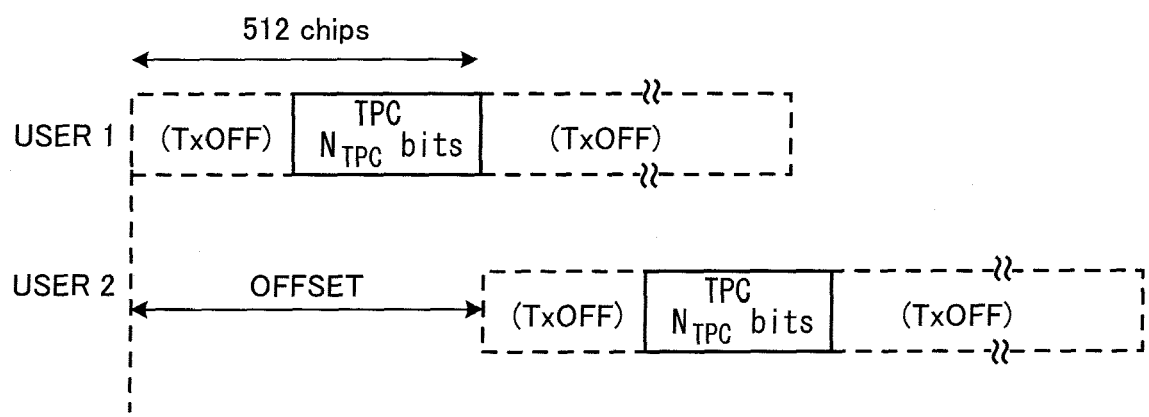
FIG. 17 is a drawing that explains the transmission timing of a F-DPCH.
Figure 18:
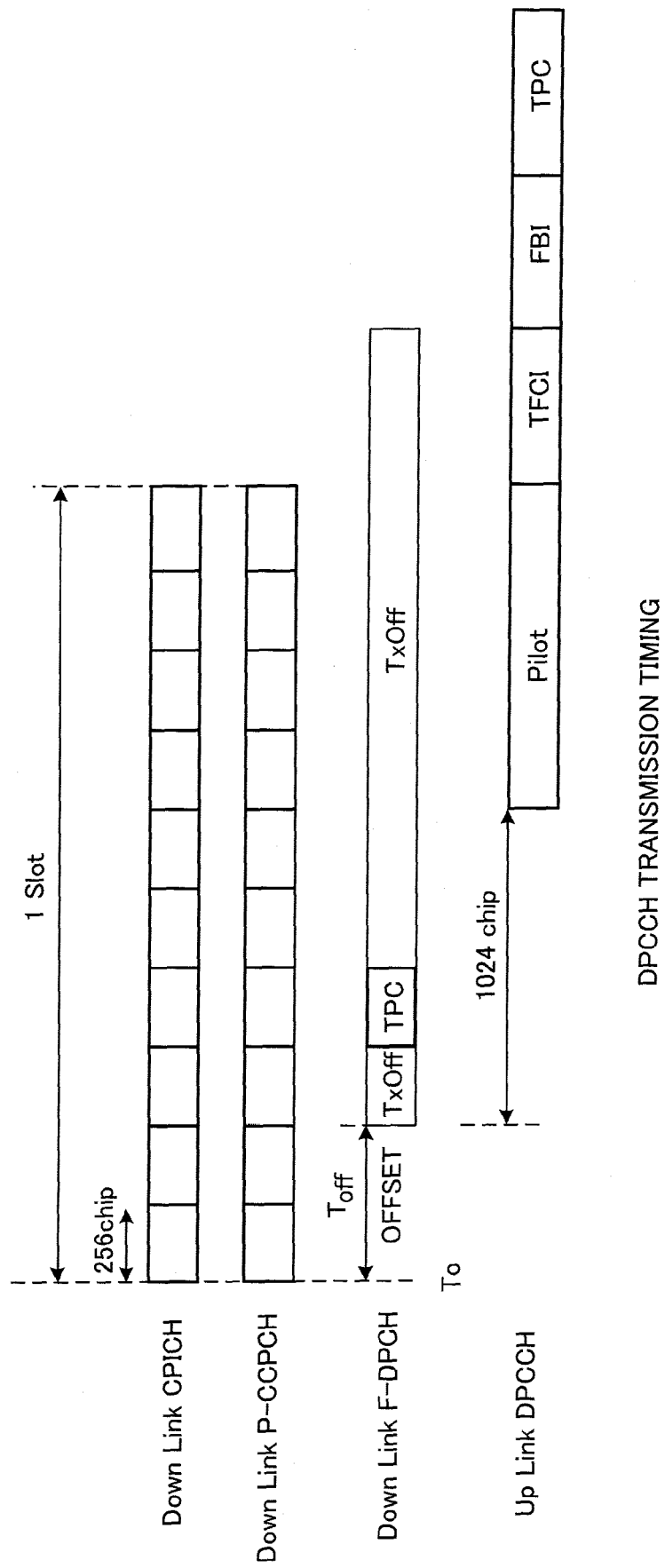
FIG. 18 is a drawing that explains the transmission timing of a F-DPCH that is transmitted from a base station, and a DPCCH that includes a TPC bit that is transmitted from a mobile station.
Figure 19:
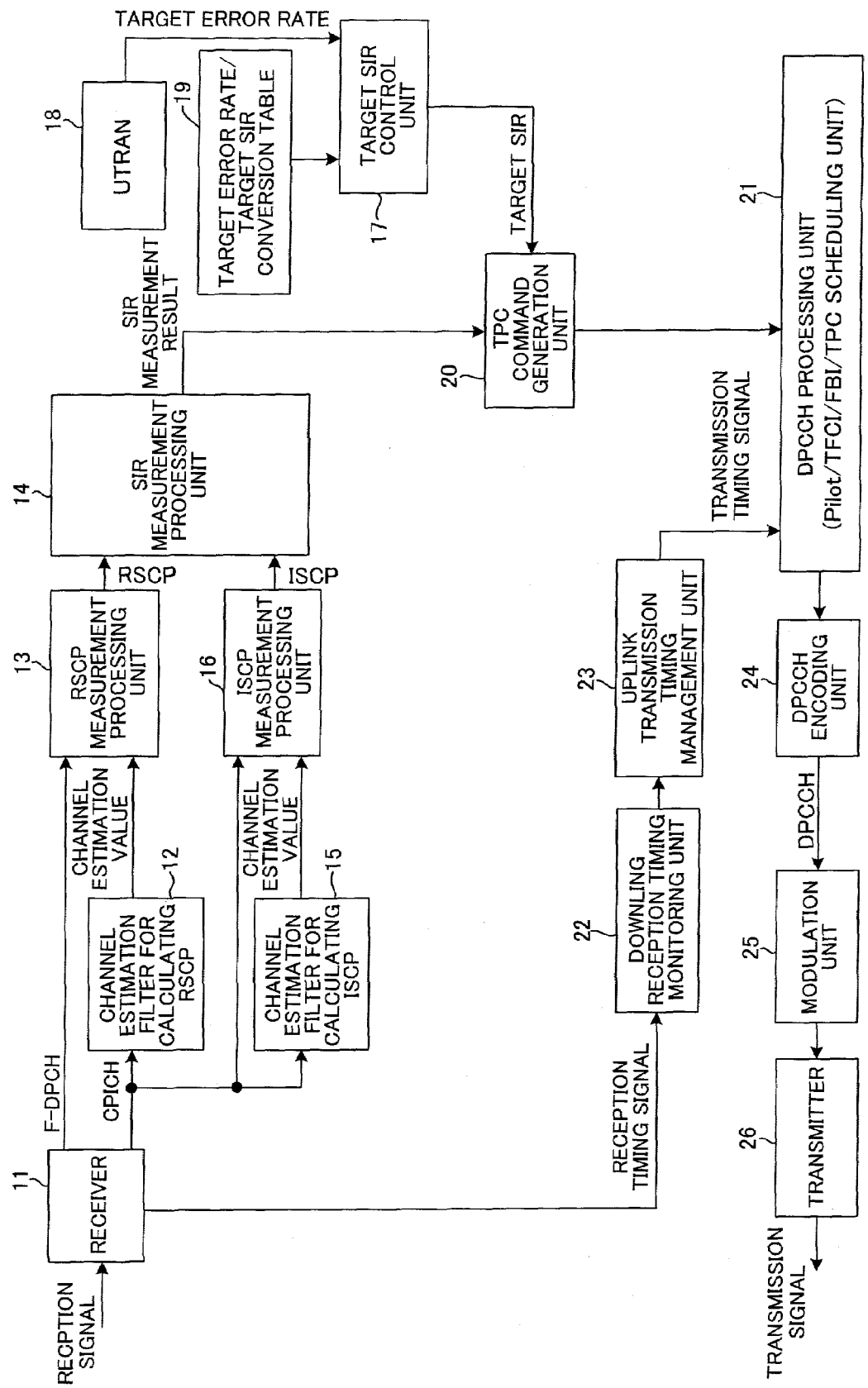
FIG. 19 is a drawing showing the construction of a conventional mobile station.

FIG. 9 is a drawing showing the construction of a mobile station of a fifth embodiment of the invention, where the same reference numbers are given to parts that are identical to those of the second embodiment shown in FIG. 4. This embodiment differs by the points described below.

(1) A suitable target error rate/target SIR conversion table is selected based on decoding error of the TPC symbol, and based on that conversion table, the target SIR control unit 71 sets a target SIR that corresponds to target error rate, and inputs that target SIR to the TPC command generation unit 58.

(2) The SIR measurement unit 56a uses the RSCP and ISCP that are input from the RSCP measurement unit 53 and ISCP measurement unit 55 to calculate the SIR, then inputs that SIR to the TPC command generation unit 58, and the TPC command generation unit 58 uses the target SIR and calculated SIR to decide the TPC bit.

A TPC symbol decoding unit 91 decodes that channel compensated TPC symbol that is output from the RSCP measurement unit 53 and outputs the decoded result. The RSCP measurement unit 53 uses a past channel estimation value to perform channel compensation of the TPC symbol, so the number of errors included in the decoded result increases depending on the fading environment. A reference TPC symbol decoding unit 92 decodes the channel compensated TPC symbol that is output from the reference RSCP measurement unit 83, and outputs the decoded result. The reference RSCP measurement unit 83 uses the current channel estimation value to perform channel compensation of the TPC symbol, so the number of errors included in the decoding result is small regardless of a fading environment. A TPC symbol error measurement unit 93 compares the TPC symbol decoded results that are output from the TPC symbol decoding unit 91 and reference TPC symbol decoding unit 92, and calculates the decoding error rate using the number of comparison and number of differences, then inputs that decoding error rate to the target error rate/target SIR conversion table unit 73.

As shown in FIG. 10, a plurality of target error rate/target SIR conversion tables 73a" to 73c" are prepared in advance in a conversion table unit 73 according to the decoding error rate, and the conversion table unit 73 decides a table in the target SIR control unit 71 according to the input decoding error rate. The target SIR control unit 71 uses the decided table to set a target SIR according to the target error rate, and inputs that target SIR to the TPC command generation unit 58.

With this fifth embodiment, by using a suitable table, it is possible to set a TPC bit so that a desired error rate is obtained.

In the description above, each the first thru fifth embodiments, however, of course it is possible to use combinations of the embodiments.

As many apparently widely different embodiments of the present invention can be made without departing from the spirit and scope thereof, it is to be understood that the invention is not limited to the specific embodiments thereof except as defined in the appended claims.

What is claimed is:

1. A reception quality measurement method implemented in a mobile station that receives F-DCPH (Fractional Dedicated Physical Channel) symbols and CPICH (Common Pilot Channel) symbols from a base station, the method comprising:
   implementing a first estimation that estimates a channel on the basis of an average of a plurality of CPICH symbols in a time sequence before a certain time of interest, then calculating an interference power ISCP (Interference on Signal Code Power) using a channel estimation value obtained by the first estimation and the CPICH symbol at the time of interest;
   implementing a second estimation that estimates a channel on the basis of an average of a plurality of CPICH symbols in a time sequence that include the CPICH symbol at the time of interest, then calculating a reference ISCP using a channel estimation value obtained by the second estimation and the CPICH symbol at the time of interest;
   correcting an interference power ISCP at the next time of interest using the difference between the ISCP and the reference ISCP; and
   calculating a signal to interference power ratio SIR of the mobile station using the ISCP obtained by the correction and a reception power RSCP (Received Signal Code Power) of the F-DCPH symbol.

2. The reception quality measurement method of claim 1, wherein the RSCP that is used when calculating the SIR is acquired by:
   implementing a third estimation that estimates a channel on the basis of an average of a plurality of CPICH symbols in a time sequence before the certain time of interest, then calculating the reception power RSCP of the F-DCPH symbol using a channel estimation value obtained by the third estimation and the F-DCPH symbol at the time of interest;
   implementing a fourth estimation that estimates a channel on the basis of an average of a plurality of CPICH symbols in a time sequence that include the CPICH symbol at the time of interest, then calculating a reference RSCP using a channel estimation value obtained by the fourth estimation and the F-DCPH symbol at that time of interest; and
   correcting a reception power RSCP at the next time of interest using the difference between the RSCP and the reference RSCP.

3. The reception quality measurement method of claim 1, further comprising a step of making the SIR suitable by multiplying the difference by a coefficient.

4. The reception quality measurement method of claim 2, further comprising a step of making the SIR suitable by multiplying the difference by a coefficient.

5. The reception quality measurement method of claim 1, further comprising a step of generating transmission power information based on the size of the calculated SIR and a target SIR, and sending that information to the base station.

6. A reception quality measurement method implemented in a mobile station that receives F-DCPH (Fractional Dedicated Physical Channel) symbols and CPICH (Common Pilot Channel) symbols from a base station, the method comprising:
 implementing a first estimation that estimates a channel on the basis of an average of a plurality of CPICH symbols in a time sequence before a certain time of interest, then calculating a reception power RSCP (Received Signal Code Power) of F-DCPH symbol using a channel estimation value obtained by the first estimation and the F-DCPH symbol at the time of interest;
 implementing a second estimation that estimates a channel on the basis of an average of a plurality of CPICH symbols in a time sequence that include the CPICH symbol at the time of interest, then calculating a reference RSCP of F-DCPH symbol using a channel estimation value obtained by the second estimation and the F-DCPH symbol at that time of interest;
 correcting a reception power RSCP at the next time of interest using the difference between the RSCP and the reference RSCP; and
 calculating a signal to interference power ratio SIR of the mobile station using the corrected RSCP and a reception power of an interference signal ISCP (Interference on Signal Code Power).

7. The reception quality measurement method of claim 6, further comprising a step of making the SIR suitable by multiplying the difference by a coefficient.

8. The reception quality measurement method of claim 6, further comprising a step of generating transmission power information based on the size of the calculated SIR and a target SIR, and sending that information to the base station.

9. A transmission power control method implemented in a mobile station that receives F-DCPH (Fractional Dedicated Physical Channel) symbols and CPICH (Common Pilot Channel) symbols from a base station, the method comprising:
 implementing a first estimation that estimates a channel on the basis of an average of a plurality of CPICH symbols in a time sequence before a certain time of interest, then calculating an interference power ISCP (Interference on Signal Code Power) using a channel estimation value obtained by the first estimation and the CPICH symbol at the time of interest;
 implementing a second estimation that estimates a channel on the basis of an average of a plurality of CPICH symbols in a time sequence that include the CPICH symbol at the time of interest, then calculating a reference ISCP using a channel estimation value obtained by the second estimation and the CPICH symbol at the time of interest;
 deciding a target error rate/target SIR correspondence table based on the difference between the ISCP and the reference ISCP;
 acquiring a target SIR that corresponds to a target error rate using that table;
 calculating an SIR using a reception power RSCP (Received Signal Code Power) and an interference power ISCP at the next time of interest; and
 generating transmission power information based on the size of the calculated SIR and the target SIR, then sending that transmission power information to the base station.

10. A transmission power control method implemented in a mobile station that receives F-DCPH (Fractional Dedicated Physical Channel) symbols and CPICH (Common Pilot Channel) symbols from a base station, the method comprising:
 implementing a first estimation that estimates a channel on the basis of an average of a plurality of CPICH symbols in a time sequence before a certain time of interest, then calculating a reception power RSCP (Received Signal Code Power) of F-DCPH symbol using a channel estimation value obtained by the first estimation and the F-DCPH symbol at the time of interest;
 implementing a second estimation that estimates the channel on the basis of an average of a plurality of CPICH symbols in a time sequence that include the CPICH symbol at the time of interest, then calculating a reference RSCP of F-DCPH symbol using a channel estimation value obtained by the second estimation and the F-DCPH symbol at that time of interest;
 deciding a target error rate/target SIR correspondence table based on the difference between the RSCP and the reference RSCP;
 acquiring a target SIR that corresponds to a target error rate using that table;
 calculating an SIR using a reception power RSCP of F-DCPH symbol and an interference power ISCP (Interference on Signal Code Power) at the next time of interest; and
 generating transmission power information based on the size of the calculated SIR and the target SIR, then sending that transmission power information to the base station.

11. A transmission power control method implemented in a mobile station that receives F-DCPH (Fractional Dedicated Physical Channel) symbols and CPICH (Common Pilot Channel) symbols from a base station, the method comprising:
 implementing a first estimation that estimates a channel on the basis of an average of a plurality of CPICH symbols in a time sequence before a certain time of interest, performing channel compensation of the F-DCPH symbol at the time of interest using a channel estimation value obtained by the first estimation, then decoding the channel compensated F-DCPH symbol and outputting the decoded result;
 implementing a second estimation that estimates a channel on the basis of an average of a plurality of CPICH symbols in a time sequence that include the CPICH symbol at the time of interest, performing channel compensation of the F-DCPH symbol at the time of interest using a channel estimation value obtained by the second estimation, then decoding the channel compensated F-DCPH symbol and outputting a reference decoded result;
 deciding a target error rate/target SIR correspondence table based on the decoding error rate that is obtained by comparing the decoded result and the reference decoded result;
 acquiring a target SIR that corresponds to a target error rate using that table;
 calculating an SIR using a reception power RSCP (Received Signal Code Power) of F-DCPH symbol and an interference power ISCP (Interference on Signal Code Power) at the next time of interest; and generating transmission power information based on the size of the calculated SIR and the target SIR, then sending that transmission power information to the base station.

12. A reception quality measurement device for a mobile station that receives F-DCPH (Fractional Dedicated Physical Channel) symbols and CPICH (Common Pilot Channel) symbols from a base station, comprising:

an ISCP calculation unit that implements a first estimation that estimates a channel on the basis of an average of a plurality of CPICH symbols in a time sequence before a certain time of interest, then calculates an interference power ISCP (Interference on Signal Code Power) using a channel estimation value obtained by the first estimation and the CPICH symbol at the time of interest;

a reference ISCP calculation unit that implements a second estimation that estimates a channel on the basis of an average of a plurality of CPICH symbols in a time sequence that include the CPICH symbol at the time of interest, then calculates a reference ISCP using a channel estimation value obtained by the second estimation and the CPICH symbol at the time of interest;

an ISCP error calculation unit that calculates the difference between the ISCP and the reference ISCP;

an ISCP correction unit that corrects an interference power ISCP at the next time of interest based on that difference; and an SIR calculation unit that calculates a signal to interference power ratio SIR of the mobile station using the ISCP obtained by the correction and a reception power RSCP (Received Signal Code Power) of the F-DCPH symbol.

13. The reception quality measurement device of claim 12, further comprising:

an RSCP calculation unit that implements a third estimation that estimates a channel on the basis of an average of a plurality of CPICH symbols in a time sequence before the certain time of interest, then calculates the reception power RSCP of that symbol using a channel estimation value obtained by the third estimation and the F-DCPH symbol at the time of interest;

a reference RSCP calculation unit that implements a fourth estimation that estimates a channel on the basis of an average of a plurality of CPICH symbols in a time sequence that include the CPICH symbol at the time of interest, then calculates a reference RSCP using a channel estimation value obtained by the fourth estimation and the F-DCPH symbol at the time of interest;

an RSCP error calculation unit that calculates the difference between the RSCP and the reference RSCP; and an RSCP correction unit that corrects a reception power RSCP at the next time of interest based on that difference, and outputs the RSCP that is used when calculating said SIR.

14. The reception quality measurement device of claim 12, that makes the SIR suitable by multiplying the difference by a coefficient.

15. The reception quality measurement device of claim 13 that makes the SIR suitable by multiplying the difference by a coefficient.

16. The reception quality measurement device of claim 12, further comprising:

a transmission power information generation unit that generates transmission power information based on the size of the calculated SIR and a target SIR; and a transmission unit that sends that information to the base station.

17. A reception quality measurement device for a mobile station that receives F-DCPH (Fractional Dedicated Physical Channel) symbols and CPICH (Common Pilot Channel) symbols from a base station, comprising:

an RSCP calculation unit that implements a first estimation that estimates a channel on the basis of an average of a plurality of CPICH symbols in a time sequence before a certain time of interest, then calculates a reception power RSCP (Received Signal Code Power) of F-DCPH symbol using a channel estimation value obtained by the first estimation and the F-DCPH symbol at the time of interest;

a reference RSCP calculation unit that implements a second estimation that estimates a channel on the basis of an average of a plurality of CPICH symbols in a time sequence that include the CPICH symbol at the time of interest, then calculates a reference RSCP of F-DCPH symbol using a channel estimation value obtained by the second estimation and the F-DCPH symbol at the time of interest;

an RSCP error calculation unit that calculates the difference between the RSCP and the reference RSCP;

an RSCP correction unit that corrects a reception power RSCP at the next time of interest based on that difference; and an SIR calculation unit that calculates a signal to interference power ratio SIR of the mobile station using the corrected RSCP and a reception power of the interference signal ISCP (Interference on Signal Code Power).

18. The reception quality measurement device of claim 17 that makes the SIR suitable by multiplying the difference by a coefficient.

19. The reception quality measurement device of claim 17, further comprising:

a transmission power information generation unit that generates transmission power information based on the size of the calculated SIR and a target SIR; and a transmission unit that sends that information to the base station.

20. A transmission power control device for a mobile station that receives F-DCPH (Fractional Dedicated Physical Channel) symbols and CPICH (Common Pilot Channel) symbols from a base station, comprising:

an ISCP calculation unit that implements a first estimation that estimates a channel on the basis of an average of a plurality of CPICH symbols in a time sequence before a certain time of interest, then calculates an interference power ISCP (Interference on Signal Code Power) using a channel estimation value obtained by the first estimation and the CPICH symbol at the time of interest;

a reference ISCP calculation unit that implements a second estimation that estimates a channel on the basis of an average a plurality of CPICH symbols in a time sequence that include the CPICH symbol at the time of interest, then calculates a reference ISCP using a channel estimation value obtained by the second estimation and the CPICH symbol at the time of interest;

an ISCP error calculation unit that calculates the error between the ISCP and the reference ISCP;

a table decision unit that decides a target error rate/target SIR correspondence table based on the difference;

a target SIR acquisition unit that acquires a target SIR that corresponds to a target error rate using that table;

an SIR calculation unit that calculates an SIR using a reception power RSCP (Received Signal Code Power) of the F-DCPH symbol and an interference power ISCP at the next time of interest;

a transmission power information generation unit that generates transmission power information based on the size of the calculated SIR and the target SIR; and a transmission unit that sends that transmission power information to the base station.

21. A transmission power control device for a mobile station that receives F-DCPH (Fractional Dedicated Physical Channel) symbols and CPICH (Common Pilot Channel) symbols from a base station, comprising:

an RSCP calculation unit that implements a first estimation that estimates a channel on the basis of an average of a plurality of CPICH symbols in a time sequence before a certain time of interest, then calculates a reception power RSCP (Received Signal Code Power) of F-DCPH symbol using a channel estimation value obtained by the first estimation and the F-DCPH symbol at the time of interest;

a reference RSCP calculation unit that implements a second estimation that estimates a channel on the basis of an average of a plurality of CPICH symbols in a time sequence that include the CPICH symbol at the time of interest, then calculates a reference RSCP of F-DCPH symbol using a channel estimation value obtained by the second estimation and the F-DCPH symbol at that time of interest;

an RSCP error calculation unit that calculates the error between the RSCP and the reference RSCP;

a table decision unit that decides a target error rate/target SIR correspondence table based on the difference;

an target SIR acquisition unit that acquires a target SIR that corresponds to a target error rate using that table;

an SIR calculation unit that calculates an SIR using a reception power RSCP of the F-DCPH symbol and an interference power ISCP (Interference on Signal Code Power) at the next time of interest;

a transmission power information generation unit that generates transmission power information based on the size of the calculated SIR and the target SIR; and a transmission unit that sends that transmission power information to the base station.

22. A transmission power control device for a mobile station that receives F-DCPH (Fractional Dedicated Physical Channel) symbols and CPICH (Common Pilot Channel) symbols from a base station, comprising:

a decoding unit that averages a plurality of CPICH symbols in a time sequence before a certain time of interest and estimates a channel, uses an obtained channel estimation value to perform channel compensation of the F-DCPH symbol at the time of interest, then decodes a channel compensated F-DCPH symbol and outputs a decoded result;

a reference decoding unit that averages a plurality of CPICH symbols in a time sequence that include the CPICH symbol at the time of interest and estimates a channel, uses an obtained channel estimation value to perform channel compensation of the F-DCPH symbol at the time of interest, then decodes a channel compensated F-DCPH symbol and outputs a reference decoded result;

a decoding error rate calculation unit that compares the decoded result and the reference decoded result and calculates a decoding error rate;

a table decision unit that decides a target error rate/target SIR correspondence table based on the decoding error rate;

a target SIR acquisition unit that acquires a target SIR that corresponds to a target error rate using that table;

an SIR calculation unit that calculates an SIR using a reception power RSCP (Received Signal Code Power) of the F-DCPH symbol and an interference power ISCP (Interference on Signal Code Power) at the next time of interest;

a transmission power information generation unit that generates transmission power information based on the size of the calculated SIR and said target SIR; and a transmission unit that sends that transmission power information to the base station.

* * * * *